US012812417B2

(12) United States Patent
Freda et al.

(10) Patent No.: US 12,812,417 B2

(45) Date of Patent: Nov. 24, 2026

(54) SL RLF IN MULTICARRIER WITH LICENSED AND UNLICENSED

(71) Applicant: INTERDIGITAL PATENT HOLDINGS, INC., Wilmington, DE (US)

(72) Inventors: Martino Freda, Laval (CA); Tuong Hoang, Montreal (CA); Aata El Hamss, Laval (CA); Tao Deng, New York, NY (US); Virgile Garcia, Antibes (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/762,257

(22) Filed: Jul. 2, 2024

(65) Prior Publication Data

US 2025/0056260 A1 Feb. 13, 2025

Related U.S. Application Data

(60) Provisional application No. 63/531,211, filed on Aug. 7, 2023, provisional application No. 63/531,223, filed (Continued)

(51) Int. Cl.

*H04W 24/04* (2009.01)

*H04W 76/14* (2018.01)

(Continued)

(52) U.S. Cl.

CPC ........... *H04W 24/04* (2013.01); *H04W 76/14* (2018.02); *H04W 76/30* (2018.02); *H04W 92/18* (2013.01)

(58) Field of Classification Search

CPC ...... H04B 1/74; H04L 41/0654; H04W 24/04; H04W 76/14; H04W 76/23; H04W 76/30; H04W 92/18; H04W 76/32; H04W 76/34

See application file for complete search history.

(56) References Cited

U.S. PATENT DOCUMENTS

| | | | | |
|---|---|---|---|---|
| 11,438,892 B2 | 9/2022 | Hou et al. | | |
| 2023/0128455 A1* | 4/2023 | Kang | .................... | H04W 76/14 370/216 |

(Continued)

FOREIGN PATENT DOCUMENTS

| | | | | |
|---|---|---|---|---|
| EP | 4418582 A1 | 8/2024 | | |
| WO | WO-2020192277 A1 * | 10/2020 | ............ | H04W 24/08 |

(Continued)

OTHER PUBLICATIONS

Wang et al., "Multi-Carrier Sidelink Management Method and Terminal," machine English Translation of WO 2020192277 A1, Clarivate Analytics, pp. 1-47. (Year: 2024).*

(Continued)

*Primary Examiner* — Thomas R Cairns

(74) *Attorney, Agent, or Firm* — Volpe Koenig

(57) ABSTRACT

A sidelink (SL) wireless transmit and receive unit (WTRU) may be configured establish a unicast link with a peer WTRU allowing use of a plurality of SL carriers and transmits data, on at least a first SL carrier to the peer WTRU. The WTRU determines a carrier-specific SL radio link failure (RLF) of the first SL carrier based on a number of detected consecutive hybrid automatic repeat request (HARQ) discontinuous transmissions (DTXs) exceeding a threshold HARQ DTX count and performs a SL carrier reselection procedure to select a second SL carrier, excluding SL carriers determined with carrier-specific SL RLF. The WTRU transmits, to the peer WTRU on one of the plurality of SL carriers without carrier-specific SL RLF, an indication of the carrier-specific RLF of the first SL carrier. If no SL available SL carrier remains, the WTRU releases the unicast link with the peer WTRU. Additional embodiments are disclosed.

15 Claims, 10 Drawing Sheets

Related U.S. Application Data on Aug. 7, 2023, provisional application No. 63/531,220, filed on Aug. 7, 2023, provisional application No. 63/531,231, filed on Aug. 7, 2023, provisional application No. 63/531,227, filed on Aug. 7, 2023.

(51) Int. Cl.
*H04W 76/30* (2018.01)
*H04W 92/18* (2009.01)

(56) References Cited

U.S. PATENT DOCUMENTS

| | | | | |
|---|---|---|---|---|
| 2023/0300695 | A1 | 9/2023 | Zheng et al. | |
| 2023/0397231 | A1* | 12/2023 | Jeong | H04L 1/1812 |
| 2024/0032076 | A1* | 1/2024 | Li | H04W 72/40 |
| 2024/0260066 | A1* | 8/2024 | Li | H04L 1/18 |

FOREIGN PATENT DOCUMENTS

| | | | |
|---|---|---|---|
| WO | 2023073210 | A1 | 5/2023 |
| WO | 2024081919 | A2 | 4/2024 |
| WO | 2024087919 | A1 | 5/2024 |

OTHER PUBLICATIONS

InterDigital Inc., "Carrier Aggregation in NR SL for unicast," 3GPP RAN WG2 Meeting #123, R2-2308379, Toulouse, France (Aug. 21-25, 2023).

InterDigital, "Miscellaneous Rapporteur Stage 2 Corrections for NR Sidelink Evolution," 3GPP TSG-RAN WG2 Meeting #125bis, R2-2403926, Changsha, China (Apr. 15-19, 2024).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).

Third Generation Partnership Project, "Technical Specification Group Radio Access Network; NR; Medium Access Control (MAC) protocol specification (Release 18)," 3GPP TS 38.321 V18.1.0 (Mar. 2024).

Third Generation Partnership Project, "Technical Specification Group Radio Access Network; NR; Radio Resource Control (RRC) protocol specification (Release 18)," 3GPP TS 38.331 V18.1.0 (Mar. 2024).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 17)," 3GPP TS 36.300 V17.5.0 (Jun. 2023).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 17)," 3GPP TS 36.300 V17.7.0 (Mar. 2024).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 18)," 3GPP TS 36.300 V18.1.0 (Mar. 2024).

Third Generation Partnership Project, "Technical Specification Group Radio Access Network; NR; Radio Resource Control (RRC) protocol specification (Release 18)," 3GPP TS 38.331 V17.8.0 (Mar. 2024).

Third Generation Partnership Project, "Technical Specification Group Radio Access Network; NR; Radio Resource Control (RRC) protocol specification (Release 18)," 3GPP TS 38.331 V17.5.0 (Jun. 2023).

Third Generation Partnership Project, "Technical Specification Group Radio Access Network; NR; Medium Access Control (MAC) protocol specification (Release 17)," 3GPP TS 38.321 V17.8.0 (Mar. 2024).

Third Generation Partnership Project, "Technical Specification Group Radio Access Network; NR; Medium Access Control (MAC) protocol specification (Release 17)," 3GPP TS 38.321 V17.5.0 (Jun. 2023).

Third Generation Partnership Project, "Technical Specification Group Radio Access Network; NR; NR and NG-RAN Overall Description; Stage 2 (Release 18)," 3GPP TS 38.300 V18.1.0 (Mar. 2024).

Third Generation Partnership Project, "Technical Specification Group Radio Access Network; NR; NR and NG-RAN Overall Description; Stage 2 (Release 17)," 3GPP TS 38.300 V17.8.0 (Mar. 2024).

Third Generation Partnership Project, "Technical Specification Group Radio Access Network; NR; NR and NG-RAN Overall Description; Stage 2 (Release 17)," 3GPP TS 38.300 V17.5.0 (Jun. 2023).

Third Generation Partnership Project, "Technical Specification Group Radio Access Network; Evolved Universal Terrestrial Radio Access (E-UTRA); Medium Access Control (MAC) protocol specification (Release 18)," 3GPP TS 36.321 V18.1.0 (Mar. 2024).

Third Generation Partnership Project, "Technical Specification Group Radio Access Network; Evolved Universal Terrestrial Radio Access (E-UTRA); Medium Access Control (MAC) protocol specification (Release 17)," 3GPP TS 36.321 V17.7.0 (Dec. 2023).

Third Generation Partnership Project, "Technical Specification Group Radio Access Network; Evolved Universal Terrestrial Radio Access (E-UTRA); Medium Access Control (MAC) protocol specification (Release 17)," 3GPP TS 36.321 V17.5.0 (Jun. 2023).

* cited by examiner

SL RLF IN MULTICARRIER WITH LICENSED AND UNLICENSED

CROSS-REFERENCE TO RELATED APPLICATIONS

This application claims the benefit of U.S. Provisional Application No. 63/531,227, filed Aug. 7, 2023, the contents of which are incorporated herein by reference.

BACKGROUND

Multicarrier has been specified for new radio (NR) sidelink (SL) in 3rd generation partnership (3GPP) Release 18. Multicarrier is expected to use long term evolution (LTE) as a baseline, while potentially considering some differences to account for unicast transmission in NR. In addition, unlicensed operation for SL is also being specified and there are no expectations to have these two features interact. Specifically, multicarrier operation is considered for licensed carriers in the case of Rel18 user equipment (UE). Furthermore, unlicensed operation is being considered for a single carrier only. It is expected, however, that future releases will need to support UEs which operate over a combination of licensed and unlicensed carriers.

A number of areas specific to sidelink (SL) communication are being considered for operating licensed and unlicensed carriers in a multicarrier fashion, including carrier selection, discontinuous reception (DRX) and hybrid automatic repeat request (HARQ) radio link failure (RLF). Carrier selection based on priority and channel busy ratio (CBR) may not be appropriate when a mix of licensed and unlicensed carriers are present. Specifically, licensed and unlicensed carriers cannot be considered equal from the perspective of resource usage, maintenance of QoS, and access. DRX for SL is currently designed for single carrier only. Multicarrier DRX exists for uplink and downlink (i.e., Uu interface) based on DRX groups. However, defining DRX groups has the limitations, in the context of multicarrier licensed/unlicensed in SL, that a receive (RX) UE would need to monitor all carriers configured for transmission by a transmit (TX) UE, which may not be ideal from a power consumption perspective, particularly if some of these carriers are in an unlicensed band. Hybrid automatic repeat request (HARQ)-based RLF determination is also designed for single carrier only. In SL multicarrier, whether issues on one carrier warrant determination of SL RLF of the entire link or not may vary on the carriers themselves and/or potentially on whether they are licensed/unlicensed.

Carrier selection in LTE/NR for licensed carriers treats all carriers equally and considers CBR only. Unlicensed carriers, however, are clearly not applicable for certain types of traffic and only CBR-based approach to selecting carriers may result in selecting a set of carriers that may not meet QoS requirements.

In SL, particularly in unicast, unlicensed carriers may only be used for certain traffic types or situations (e.g., large amount of traffic without stringent timing requirements). Configuring a DRX group using legacy DRX group mechanism and having the RX UE monitor SL for all carriers would be power inefficient.

Legacy SL RLF is designed for a single carrier. One issue with HARQ-based counting in unlicensed is there is no way to determine whether the HARQ DTX is due to decoding failure or LBT failure at the RX UE.

Legacy SL RLF based on HARQ feedback is designed for a single carrier only. For multicarrier, SL RLF may be based on per carrier and/or per link, and this may depend on the correlation between carriers. Solutions for multicarrier sidelink using licensed and/or unlicensed carriers are needed.

SUMMARY

According to certain aspects of the disclosure, one or more of the foregoing issues may be addressed by a UE, interchangeably referred to herein as a wireless transmit receive unit (WTRU), that selects at least one unlicensed carrier(s) for multicarrier transmission based on the QoS of data and/or amount of data available and/or the CBR on the licensed carriers.

In one example, a SL TX WTRU may be configured with one or more thresholds to determine whether to allow transmission on an unlicensed carrier for a SL radio bearer (SLRB), e.g., prioritized bit rate, buffer status threshold, CBR threshold, etc., For each destination L2 ID configured for transmission on both licensed and unlicensed, a method may include: (i) establishing one or more SL radio bearers for transmission to the L2 IDs based on the established QoS flows; (ii) determining whether to select at least one unlicensed carrier based on the one or more configured parameters in the SL radio bearers and/or the buffer status associated with the one or more SL radio bearers allowed for unlicensed operation and/or the largest CBR on any of the selected licensed carriers; (iii) selecting, for the destination, a number of licensed carriers and a number of unlicensed carriers; and (iv) transmitting data for the L2 destination ID on each of the selected carriers.

In some aspects, determining whether to select at least one unlicensed carrier based on the one or more configured parameters in the SL radio bearers and/or the buffer status associated with the one or more SL radio bearers allowed for unlicensed operation and/or the largest CBR on any of the selected licensed carriers may include, for example, if a SL radio bearer (SLRB) is configured with a prioritized bit rate greater than the threshold, if the buffer status associated with one or more SLRBs is greater than the threshold for a configured period of time, and/or if the minimum CBR of any selected licensed carrier is greater than a CBR threshold.

According to another aspect, a WTRU performs initial transmission to a first carrier (anchor carrier) and only performs subsequent transmission to other carriers following acknowledgement of the first transmission.

In one example, a SL TX WTRU establishes a unicast link with a peer WTRU and configures a number of carriers to be used for communication with the RX WTRU. The SL TX WTRU may select the licensed carrier with the lowest CBR as the anchor carrier and sends indication of the anchor carrier (e.g., in PC5-RRC) to the RX WTRU. The TX WTRU selects a SL discontinuous reception (DRX) configuration (e.g., DRX cycle, on duration, inactivity time, etc.), and sends the DRX configuration to the RX WTRU.

In one example, upon arrival of transmitted data to the RX WTRU, and if the inactivity timer at the RX WTRU is not running, the TX WTRU performs a first data transmission to the RX WTRU on the anchor carrier within the active time of the RX WTRU. The TX WTRU includes as part of the transmission (e.g., in sidelink control information (SCI)) an indication of the carrier(s) intended to be used during this active time period. Upon reception of a HARQ ACK from the first transmission, the TX WTRU initiates subsequent transmissions on the carriers indicated in the first transmission and resets the inactivity timer following transmissions on the anchor and non-anchor carriers.

In another example, upon arrival of data for transmission to the RX WTRU, and if the inactivity timer at the RX WTRU is running, the TX WTRU performs data transmissions on all carriers indicated by the last carrier transmission indication on the anchor carrier.

According to further aspects of the disclosure, a WTRU may jointly select an initial and backup resource on an unlicensed and licensed carrier respectively, when performing some transmissions for certain QoS.

In one example, a SL TX WTRU is configured with multicarrier over both licensed and unlicensed carriers as well as one or more bearers for transmission to a destination, which are configured to allow backup resource selection or not. Upon arrival of data for a bearer that allows backup resource selection, the TX WTRU may perform a joint resource (re) selection procedure on a licensed and unlicensed carrier.

In an example, the joint resource (re) selection procedure includes a first available resource is selected at time t1 on the unlicensed carrier and a second available resource is selected at time t2, later than t1, on the licensed carrier, where t1 and t2 are within the resource selection window. The TX WTRU performs listen-before-talk (LBT) for transmission on the first resource. If the LBT fails, the TX WTRU transmits data on the second resource, otherwise it transmits the data on the first resource.

According to additional aspects of the disclosure, a method is disclosed where a WTRU resets carrier-specific SL-RLF HARQ DRX counters upon reception of a message (e.g., reset MAC CE) from the RX WTRU.

In one example, a SL TX WTRU establishes a unicast link with a peer WTRU (i.e., RX WTRU) and selects multiple licensed and/or unlicensed carriers for communication. The TX WTRU performs independent (i.e., separate counters per carrier) counting of hybrid automatic repeat request (HARQ) discontinuous transmission (DTX) on each carrier (licensed and unlicensed). The TX WTRU receives a message (e.g., MAC CE) on a licensed carrier from the RX WTRU that indicates one or more unlicensed carrier(s). The TX WTRU modifies the consecutive number of HARQ DTX on the indicated carrier(s). For example, the TX WTRU resets the consecutive number of HARQ DTX counts or subtracts a value (e.g., indicated in the MAC CE) from the current consecutive HARQ DTX count. If the number of consecutive HARQ DTX on a carrier reaches a threshold, the WTRU may indicate carrier-specific SL radio link failure (RLF) to the network for that carrier.

According to yet further aspects of the disclosure, a WTRU), may trigger sidelink (SL) radio link failure (RLF), releases a unicast multicarrier link and inform the network and/or RX WTRU when resource selection is unable to find at least one licensed/unlicensed carrier that meets a channel busy ratio (CBR) threshold or not had carrier-specific RLF, e.g., within a given time period.

In one example, a SL TX WTRU is configured with a first CBR threshold for licensed carriers and a second CBR threshold for unlicensed carriers. The TX WTRU is also configured with a time period to avoid carrier selection following carrier-specific SL RLF. The SL TX WTRU establishes a unicast link with a peer/RX WTRU and selects multiple licensed/unlicensed carriers for communication. In one solution, when carrier-specific SL RLF occurs on a single carrier, carrier (re) selection is triggered and the TX WTRU to select a number of carriers on the licensed band having a CBR lower than the first threshold and a number of carriers on the unlicensed band that are below the second threshold, where the time period between triggering of carrier (re) selection and the last carrier-specific SL RLF for the unicast link exceeds the (pre) configured time period threshold.

In another solution, carrier-specific RLF may be determined for a first SL carrier of a plurality of SL carriers used in unicast SL carrier aggregation with the RX WTRU, when a number of consecutive DTXs for the first carrier exceeds a threshold DTX count. The TX WTRU performs a carrier reselection procedure to determine a second carrier from the plurality of carriers, excluding carriers previously determined to have carrier-specific RLF. The TX WTRU may provide indication of the SL RLF for the first carrier and/or of the selected second SL carrier.

According to certain aspects, when the TX WTRU is unable to select at least one carrier supported by the RX WTRU and/or not determined with carrier-specific RLF, the TX WTRU triggers a SL RLF, the unicast link is released with the RX WTRU and the TX WTRU informs the network. Otherwise, the TX WTRU selects a number of carriers and continues operation of the unicast link with the selected carriers. Additional embodiments are disclosed.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
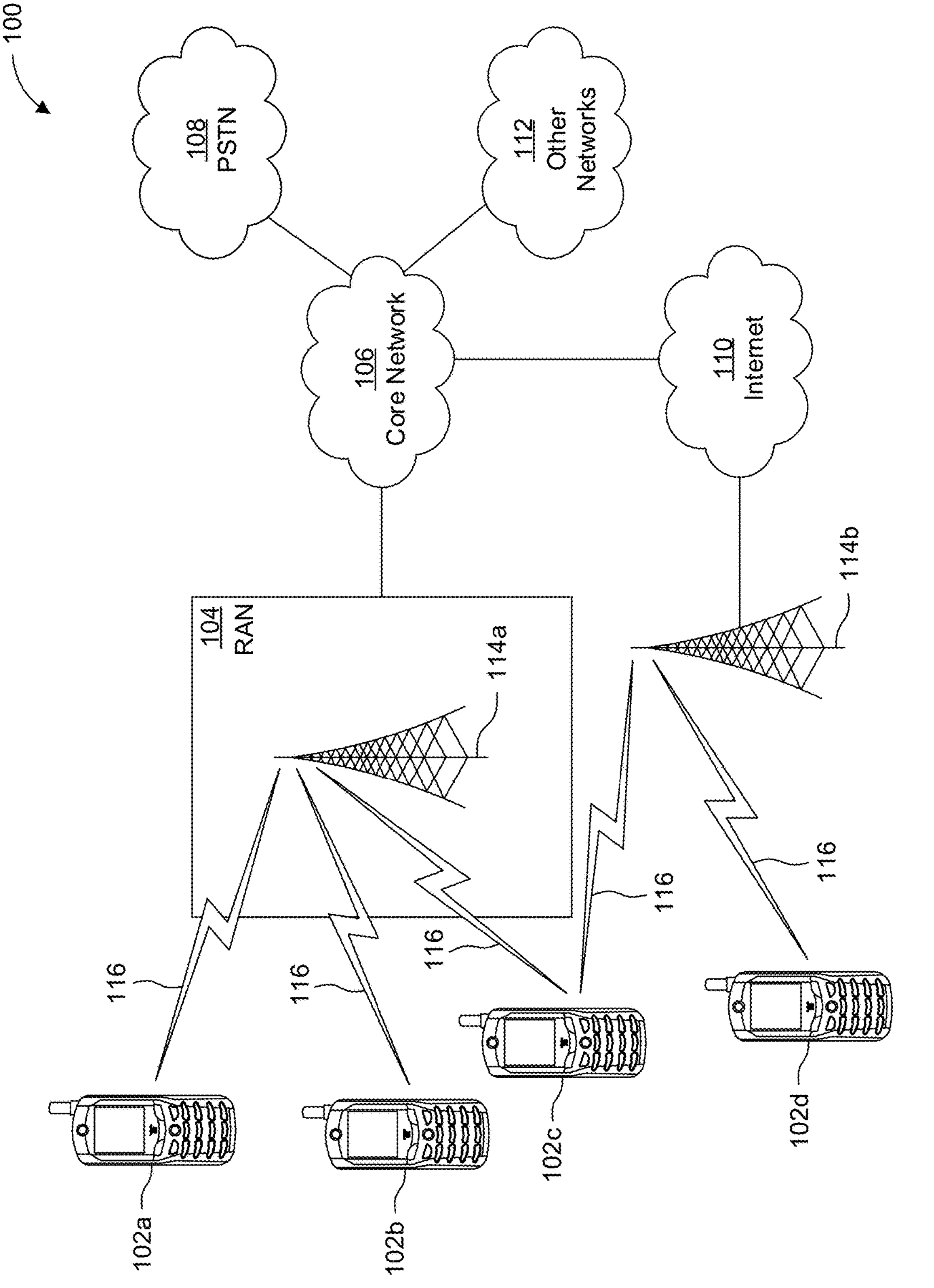
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
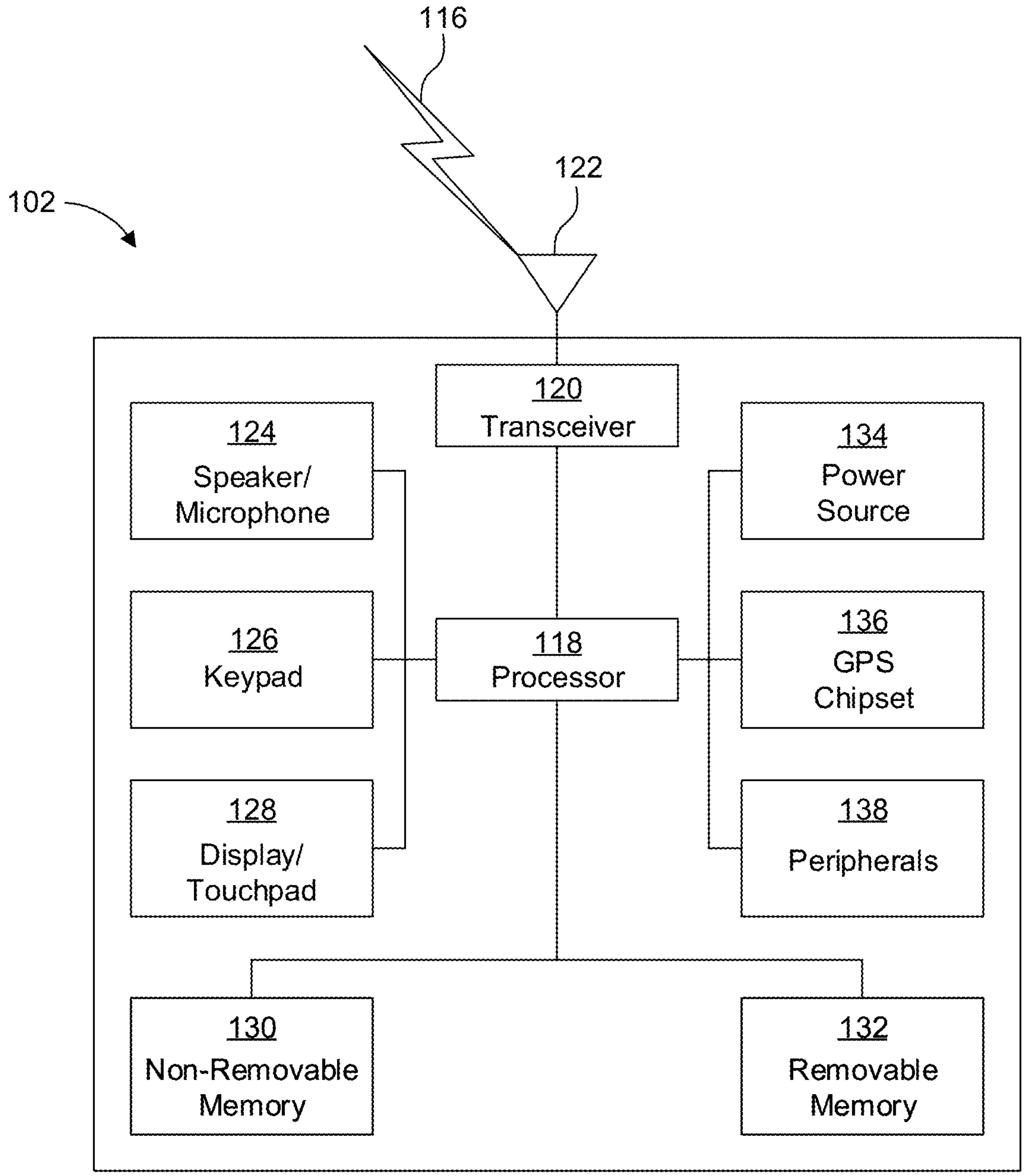
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
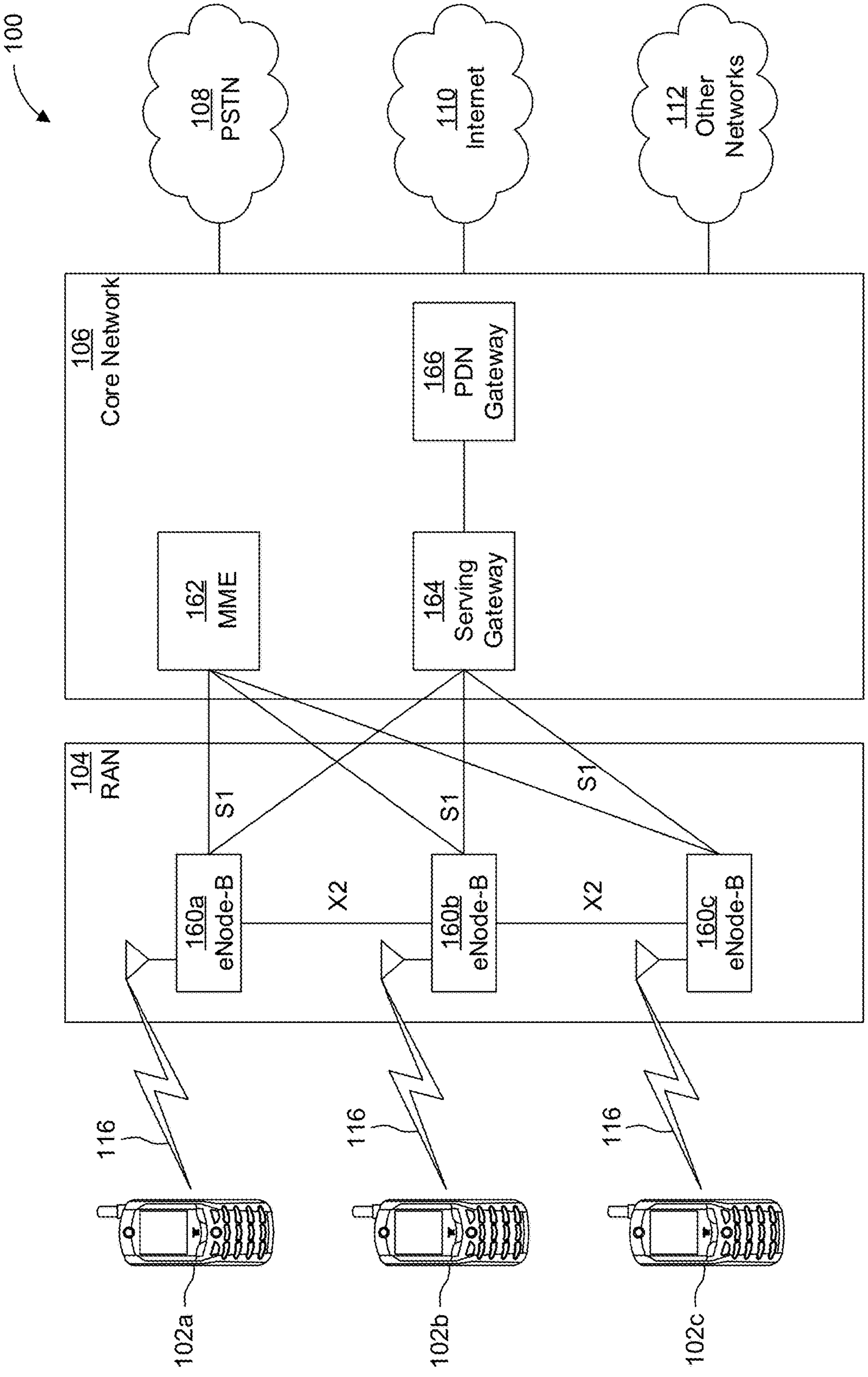
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHZ. The total bandwidth available for 802.11ah is 6 MHz to 26 MHz depending on the country code.

Figure 1D:
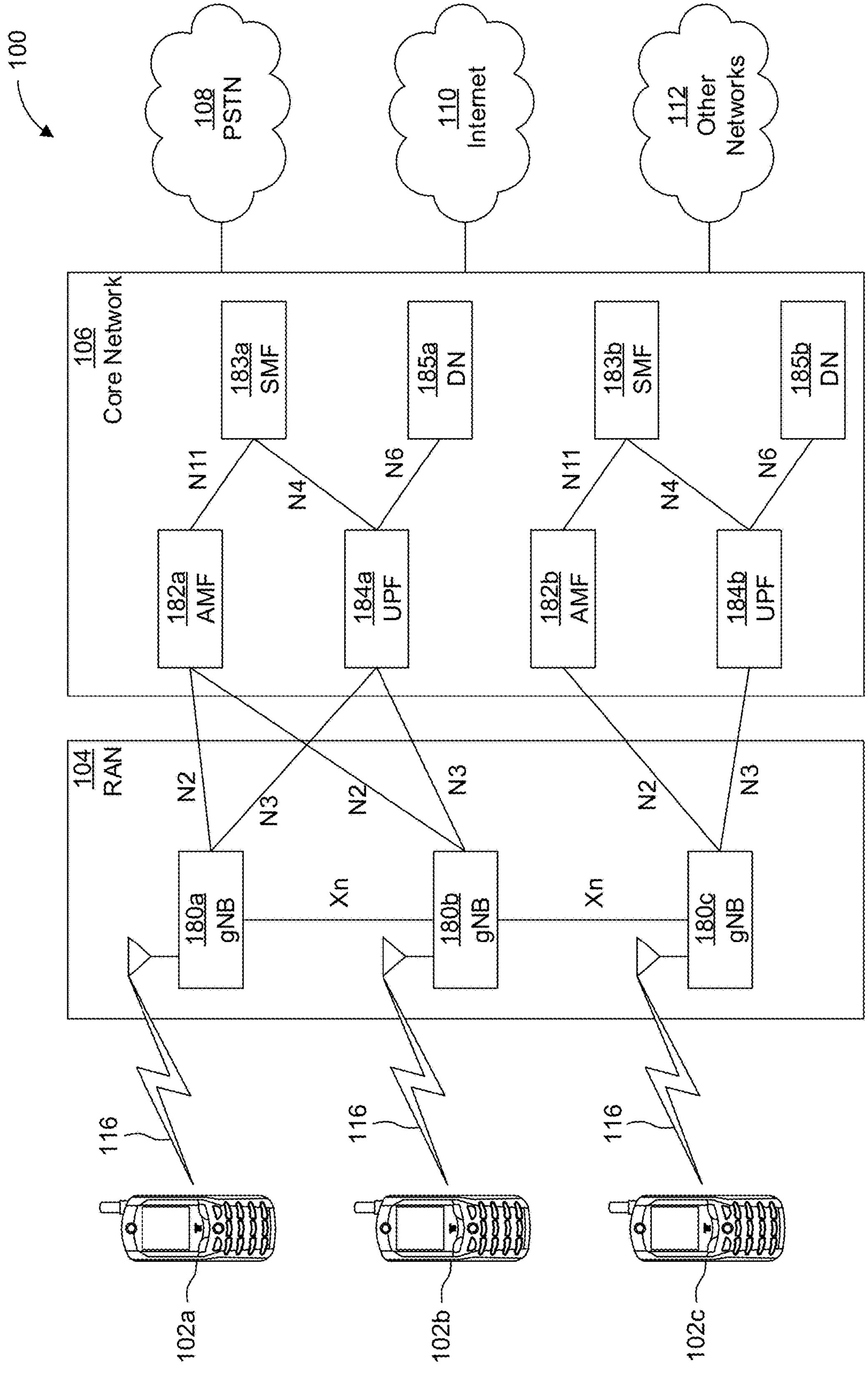
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Solutions herein are disclosed for multicarrier operation by a SL WTRU where carriers can be licensed (i.e., access is via legacy SL) or unlicensed (i.e., access requires LBT-like operation). However, solutions can be extended to consider carriers having different properties apart from the access mechanism. In many cases, solutions can similarly be applied to multicarrier over multiple licensed carriers, where there may be some difference in the configuration or properties of such carriers. Finally, solutions are applicable also to operation over multiple bandwidth parts, multiple RB sets, etc., instead of consideration of multiple carriers.

Embodiments for carrier selection among licensed and unlicensed carriers are now described. As mentioned previously, carrier selection in LTE/NR for licensed carriers treats all carriers equally and considers channel busy ratio (CBR) only. Unlicensed carriers, however, are clearly not applicable for certain types of traffic and only CBR-based approach to selecting carriers may result in selecting a set of carriers that may not meet QoS requirements.

In one example embodiment, a WTRU selects at least one unlicensed carrier(s) for multicarrier transmission based on the QoS of data and/or amount of data available and/or the CBR on the licensed carriers.

Figure 2:
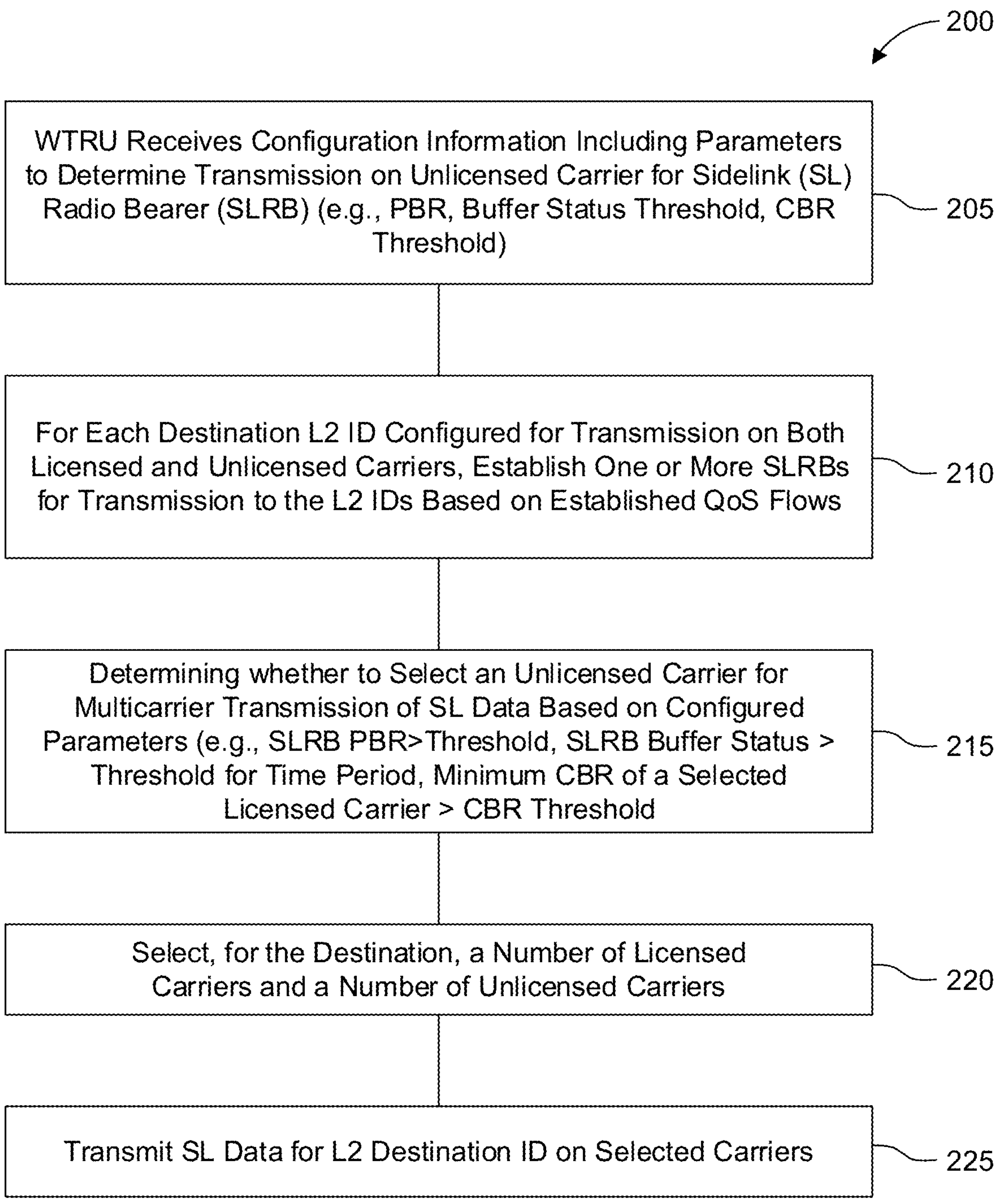
FIG. 2 is a flow diagram illustrating a method of carrier selection among licensed and unlicensed carriers according to an embodiment.

Referring to FIG. 2, an example method 200 for carrier selection among licensed and unlicensed carriers is shown. A SL TX WTRU may be configured 205 with one or more thresholds to determine whether to allow transmission on an unlicensed carrier for a SLRB (e.g., prioritized bit rate (PBR), buffer status threshold, CBR threshold, etc.). For each destination L2 ID configured for transmission on both licensed and unlicensed carriers, the WTRU may establish 210 one or more SL radio bearers for transmission to the L2 IDs based on the established QoS flows. Next, the TX WTRU determines 215 whether to select at least one unlicensed carrier based on the one or more configured parameters in the SL radio bearers and/or the buffer status associated with the one or more SL radio bearers allowed for unlicensed operation and/or the largest CBR on any of the selected licensed carriers. Based on determination 215, the TX WTRU selects 220, for the destination, a number of licensed carriers and a number of unlicensed carriers. The TX WTRU may then transmit 225 data for the L2 destination ID on each of the selected carriers.

In determining 215 whether to select at least one unlicensed carrier based on the one or more configured parameters in the SL radio bearers and/or the buffer status associated with the one or more SL radio bearers allowed for unlicensed operation and/or the largest CBR on any of the selected licensed carriers, examples may include: if a SLRB is configured with prioritized bit rate is greater than the threshold; if the buffer status associated with one or more SL radio bearers is greater than the threshold for a configured period of time; and/or if the minimum CBR of any selected licensed carrier is greater than the CBR threshold.

Carrier (re) selection behavior may be similar to legacy LTE V2X. Specifically, a SL WTRU may perform any of the following: (i) for each HARQ process, trigger carrier (re) selection based on certain conditions related to resource (re) selection; (ii) for each L2 destination ID, select a number of carriers on which to transmit from the carriers that are configured for each L2 destination ID; (iii) select resources independently on each carrier per HARQ process; (iv) for a given grant on a carrier, perform a logical channel prioritization (LCP) procedure taking in account the L2 destinations which are allowed on the carrier; and/or (v) transmit the medium access control (MAC) packet data unit (MPDU) on the carrier.

Carrier (re) selection conditions considerations for licensed or unlicensed carriers. In one family of solutions, a WTRU may perform carrier (re) selection by considering licensed and unlicensed carriers differently. The WTRU actions related to carrier (re) selection may include any one, or a combination, of determining: (i) the number of carriers to select; (ii) the number of carriers of a given type to select; (iii) whether to include a carrier of a given type in the selected carriers; (iv) when/whether to trigger carrier (re) selection; (v) whether to select carriers of one type before another type; and/or (vi) whether to prioritize a carrier of one type (e.g., licensed) over a carrier of another type (e.g., unlicensed).

Considering the type (e.g., licensed vs. unlicensed) of carrier during carrier (re) selection may include any of the following when performing the above determinations: performing the determination differently (e.g., using different conditions herein) when the carrier(s) are licensed compared to unlicensed; considering the type (licensed or unlicensed) of the currently selected carriers when performing the determination (e.g., based on some conditions herein being met); and/or performing the determination, possibly with conditions herein, while using a different condition, or a different factor when checking the conditions to perform the determination.

Conditions for (re) selecting licensed and/or unlicensed carriers. In the above embodiments, the conditions for (re) selecting carriers may include any one, or a combination of conditions relating to bearer configuration, configuration of the resource pool, QoS, cast type of the transmission, modulation and coding rate (MCR), enabled/disabled HARQ feedback, listen-before-talk (LBT) failure, channel busy ratio (CBR), channel occupancy rate (CR) and/or received signal strength indicator (RSSI) as described further below.

Conditions of bearer configuration may include: whether a bearer or logical channel is configured explicitly for some behavior or not; how the WTRU receives its bearer configuration (e.g., pre-configuration, system information block (SIB), or dedicated radio resource control (RRC) signaling); whether the bearer is a network (Uu) bearer or a SL bearer; and/or whether the bearer is a default bearer or not.

Conditions for configuration of the resource pool may encompass any factor related to the PHY channels configured for that resource pool/carrier, such as whether a PHY channel (e.g., physical sidelink feedback channel (PSFCH) is configured or the amount/density of PSFCH configured.

QOS considerations may relate to any condition associated with a parameter related to QoS, possibly of a specific bearer, such as priority, reliability, maximum bit rate (MBR) or guaranteed bit rate (GBR), and/or prioritized bit rate of a logical channel (LCH).

Cast type may include any condition associated with whether the WTRU is transmitting by way of unicast/groupcast/broadcast, such that at least one sidelink radio bearer (SLRB) is established for a specific type of cast, the WTRU's transmissions are of a specific cast, and/or the amount of data available for transmission for a specific cast is above a threshold.

Conditions related to modulation coding rate (MCR) may include any conditions associated with the value of the MCR (e.g., compared to a threshold), whether MCR is configured, or the difference in MCR between two transmissions/bearers, etc.

Conditions related to HARQ feedback enabled/disabled may include whether an LCH has HARQ feedback enabled/disabled, whether a transmission has HARQ feedback enabled/disabled, and/or whether a WTRU is configured with HARQ resources (e.g., PSFCH, physical uplink control channel (PUCCH), etc.).

Conditions related to LBT failure may include whether LBT failure has been declared, potentially over a period of time, potentially on a carrier or one or more resource block (RB) set(s) associated with a carrier, and/or the number of times, potentially consecutive, where LBT failure has occurred, potentially on a carrier or one or more RB set(s) associated with a carrier.

Conditions related to channel busy ratio (CBR) may include the CBR being above or below a threshold, the CBR increasing/decreasing by a threshold amount and/or the CBR of one carrier being above/below the CBR of another carrier, possibly by a configured amount.

Conditions related to channel occupancy rate (CR) may include the CR being above or below a threshold, the CR increasing/decreasing by a threshold amount, and/or the CR of one carrier being above/below the CR of another carrier, possibly by a configured amount Conditions related to received signal strength indicator (RSSI) may include the RSSI being above or below a threshold, the RSSI increasing/decreasing by a threshold amount, and/or the RSSI of one carrier being above/below the CR of another carrier, possibly by a configured amount.

In certain embodiments, a WTRU determines whether to select at least one (or a configured number) of carriers of a type. In one solution, a WTRU may determine whether to select one (or a configured number, or a configured percentage of the total usable) of licensed/unlicensed carriers during carrier selection, based on one or more of the above-described conditions. For example, a SL WTRU may be configured with a threshold buffer status, possibly associated with one or more of its established sidelink radio bearers (SLRBs). During carrier selection, a WTRU may be allowed to select at least one (or at least N, where N can be preconfigured) unlicensed carriers if the buffer status at the time of carrier selection trigger, is above a threshold.

In one example, a WTRU may trigger carrier (re) selection if the buffer status is below a threshold, possibly for a specified period of time, and the WTRU last selected (or is currently using) at least one (at least N) unlicensed carriers. Similarly, a WTRU may trigger carrier (re) selection if the buffer status is above a threshold, possibly for a period of time, and the WTRU last selected (or is currently using) no unlicensed carriers or less than N unlicensed carriers.

In one example, a SL WTRU may be configured with a CBR/CR threshold associated with any of the available/selected licensed carrier(s). If the CBR/CR of one/a configured number/all of the available/selected licensed carrier(s) is above a threshold, the WTRU may select at least one (at least N) unlicensed carriers. Similarly, the WTRU may consider the minimum/maximum CR/CBR of the licensed carriers. Similarly, the WTRU may consider the average CBR/CR of the licensed carriers. For example, a SL WTRU may be configured with a CBR/CR threshold associated with carrier reselection. Specifically, if the CBR/CR of one/a configured number/all of the selected licensed carrier(s) is above a threshold, potentially for a specified period of time, and the WTRU has not selected any unlicensed carriers, the WTRU may trigger reselection. Similarly, if the CBR/CR of one/a configured number/all of the selected licensed carrier (s) is below a threshold, e.g., for a period of time, and the WTRU is currently using an unlicensed carrier, the WTRU may trigger carrier reselection.

In one example embodiment, a SL WTRU may be configured with an indication in the SLRB configuration of whether a specific bearer allows selection of one or more unlicensed carriers. If the WTRU has such a SLRB established, the WTRU may select at least one (at least N) unlicensed carriers. Alternatively, if the WTRU has data available for transmission on at least one such established SLRB, the WTRU may select at least one (at least N) unlicensed carriers. For example, a SL WTRU may be configured with an indication in the SLRB configuration of the type of carrier that is preferred. A WTRU may select at least one unlicensed/licensed carrier if all/a configured number/none of the SLRB configurations indicate that unlicensed/licensed is preferred.

In another example embodiment, a SL WTRU may be configured with a threshold guaranteed bit rate (GBR), a prioritized bit rate (PBR), maximum bit rate (MBR), or similar QoS parameter related to a data rate. If the WTRU has established SLRB(s) for which the (potentially total) configured value of the QoS profile is above a threshold, the WTRU may select at least one (at least N) unlicensed carriers.

As another example, a SL WTRU may be configured with an RSSI threshold, or alternatively, a similar threshold related to measuring the amount of WiFi activity in an unlicensed carrier. Such a threshold may be configured per SLRB. If the number of unlicensed carriers in which the measured RSSI is below a threshold is above a number of carrier threshold, the WTRU may select at least one (at least N) unlicensed carriers.

In some embodiments, a SL WTRU may select a carrier type based on the cast type of its transmissions. For example, if the WTRU has broadcast transmissions, it may select only (or prioritize selection of) licensed carriers. A SL WTRU may select a number of unlicensed carriers and/or licensed carriers to take into account the number of PSFCH resources configured for the carriers (i.e., select a number of carriers or the carriers which have at least a threshold number of PSFCH resources).

Embodiments for TX WTRU operation over multiple carriers will now be described. In SL, particularly in unicast, unlicensed carriers may only be used for certain traffic types or situations (e.g., large amount of traffic without stringent timing requirements). Configuring a DRX group using legacy DRX group mechanisms and having the RX WTRU monitor SL for all carriers would be power inefficient. Accordingly, the following embodiments may provide more efficient options.

In a first example embodiment, a WTRU performs initial transmission to a first carrier (anchor carrier) and only performs subsequent transmission to other carriers following acknowledgement of the first transmission.

Figure 3:
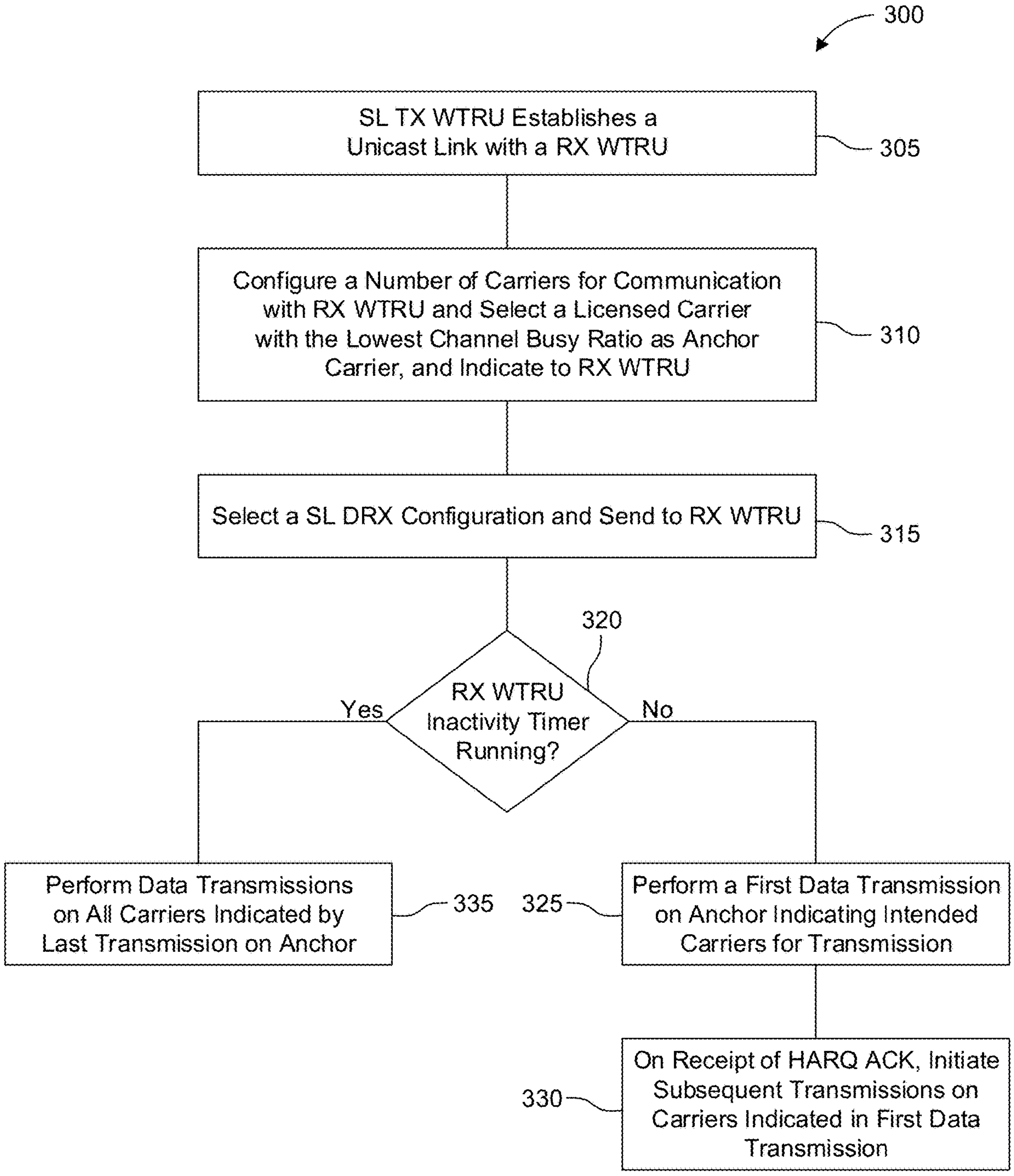
FIG. 3 is a flow diagram is a flow diagram illustrating a method of TX WTRU operation over multiple carriers according to an embodiment.

Referring to FIG. 3, an example method 300 for TX WTRU operation over multiple carriers is shown. A SL TX WTRU may establish 305 a unicast link with a peer WTRU (RX WTRU) and configure 310 a number of carriers to be used for communication with the RX WTRU. In an example, the SL TX WTRU selects the licensed carrier with the lowest CBR as the anchor carrier and sends indication of the anchor carrier (e.g., in PC5-RRC) to the RX WTRU. The SL TX WTRU selects 315 a SL DRX configuration (e.g., DRX cycle, on duration, inactivity time, etc.) and sends the DRX configuration to the RX WTRU.

Upon arrival of data for transmission to the RX WTRU, and if 320 the inactivity timer at the RX WTRU is not running, the SL TX WTRU may perform 325 a first data transmission to the RX WTRU on the anchor carrier within the active time of the RX WTRU, and include as part of the transmission (e.g., in sidelink control information (SCI)), an indication of the carrier(s) intended to be used during this active time period. Upon reception of an HARQ ACK from the RX WTRU of the first transmission, the TX WTRU initiates 330 subsequent transmissions on the carriers indicated in the first transmission and resets the inactivity timer following transmissions on the anchor and non-anchor carriers.

Upon arrival of data for transmission to the RX WTRU, and if 320 the inactivity timer at the RX WTRU is running, the TX WTRU may perform 335 data transmissions on all carriers indicated by the last carrier transmission indication on the anchor carrier.

In certain embodiments, a WTRU determines an allowed carrier(s) for a transmission when licensed and unlicensed carriers are available. In one family of solutions, a WTRU may perform transmission on multiple carriers, possibly associated with one or with multiple L2 IDs, by considering licensed and unlicensed carriers differently. The WTRU actions related to transmission may include any one, or a combination of, determining: (i) whether data can be transmitted on a carrier or not; (ii) the set of carriers/number of carriers to use for a LCH, L2 ID, or a related set of transmissions; (iii) whether to prioritize a carrier of one type over a carrier of another type when determining which carrier to transmit on; (iv) whether to include a carrier of a given type in the set of carriers to use for a LCH, L2 ID, or related set of transmissions and/or (v) when/whether to perform retransmission on a different carrier compared to transmission.

Considering the type (e.g., licensed vs unlicensed) of carrier during transmission may include any of the following when performing the above determinations: (i) performing the determination differently (e.g., using different conditions herein) when the carrier(s) are licensed compared to unlicensed; (ii) considering the type (licensed or unlicensed) of the currently selected carriers when performing the determination (e.g., based on some conditions herein being met); and/or (iii) performing the determination, possibly with conditions herein, while using a different condition, or a different factor when checking the conditions to perform the determination.

In one embodiment, a TX WTRU may select a SL resource (or be provided with a SL grant) on a licensed or unlicensed carrier. The WTRU may determine, based on rules/conditions herein, whether a transmission can be made on a licensed or unlicensed carrier. This can be achieved via a logical channel prioritization (LCP) policy or procedure. For example, a WTRU may exclude certain logical channels (LCHs), or transmissions from being performed on a carrier or a grant associated with a carrier.

A WTRU may be configured with certain conditions for allowing transmission or restricting certain transmissions on a carrier. Such conditions may be used to determine, for example, that the WTRU can perform a transmission on a licensed or unlicensed carrier. Such conditions may be used to determine, for example, that two related transmissions can be made on licensed/unlicensed, on the same/different carrier types, and/or on carriers having same/similar configuration with respect to resource pool, or properties of the carrier.

Conditions associated with the data to be transmitted on the carrier may relate to any of: bearer configuration, QoS, transmission pattern, cast type of transmission, MCR, enabled/disabled HARQ feedback, and/or time-based conditions as described herein.

Conditions related to bearer configuration may include: (i) whether a bearer or logical channel is configured explicitly for some behavior or not; (ii) how the WTRU receives its bearer configuration (e.g., pre-configuration, SIB, or dedicated RRC signaling); and/or (iii) whether the bearer is a Uu bearer or SL bearer; and/or whether the bearer is a default bearer or not.

QOS conditions may include any condition associated with a parameter related to QoS, possibly of a specific bearer, such as priority, reliability, bit rate (e.g., MBR, GBR), and/or prioritized bit rate (PBR) of a LCH.

Transmission Pattern conditions may include whether a transmission is periodic or a one-shot transmission.

Cast type of the transmission may include any condition associated with whether the WTRU is transmitting unicast/groupcast/broadcast, such as: the WTRU has at least one SLRB established of a specific cast, the WTRU's transmissions are of a specific cast and/or the amount of data available for transmission for a specific cast is above a threshold and the like.

Conditions related to MCR may include conditions associated with the value of the MCR (e.g., compared to a threshold), whether MCR is configured, or the difference in MCR between two transmissions/bearers, etc.

HARQ feedback enabled/disabled conditions may include whether a LCH has HARQ feedback enabled/disabled, whether a transmission has HARQ feedback enabled/disabled, and/or whether a WTRU is configured with HARQ resources (e.g., PSFCH, PUCCH, etc.).

Time-based conditions may include the time elapsed since the occurrence of an event, such as an event associated with another condition, for example: a time since consistent LBT failure; a time since the CBR was above/below a threshold, and/or a time since the last transmission, possibly associated with another condition.

Conditions related to the carriers themselves, may be conditions related to: (i) configuration of the resource pool; (ii) DRX behavior of the RX WTRU(s) on that carrier; (iii) LBT failure; (iv) CBR; (v) CR; (vi) RSSI; and/or (vii) number of selected carriers, as described in examples below.

Configuration of the resource pool may encompass any factor related to the PHY channels configured for that resource pool/carrier, such as whether a PHY channel (e.g., PSFCH) is configured or the amount/density of the PSFCH configured.

DRX behavior of the RX WTRU(s) on that carrier with conditions related to DRX including whether the RX WTRU is in DRX on the carrier or not, and/or the DRX pattern for that carrier.

Conditions related to LBT failure may include whether LBT failure has been declared, potentially over a period of time, or potentially on a carrier or one or more RB set(s) associated with a carrier and/or the number of times, potentially consecutive, where LBT failure has occurred, potentially on a carrier or one or more RB set(s) associated with a carrier.

Conditions related to CBR may include the CBR being above or below a threshold, the CBR increasing/decreasing by a threshold amount and/or the CBR of one carrier being above/below the CBR of another carrier, potentially by a configured amount.

Conditions related to CR may include the CR being above or below a threshold, the CR increasing/decreasing by a threshold amount, and/or the CR of one carrier being above/below the CR of another carrier, possibly by a configured threshold amount.

Conditions related to RSSI may include the RSSI being above or below a threshold, the RSSI increasing/decreasing by a threshold amount and/or the RSSI of one carrier being above/below the CR of another carrier, possibly by a configured threshold amount.

Conditions related to the number of selected carriers may include the number of unlicensed/licensed carriers selected being above/below a threshold, at least one licensed/unlicensed carrier having been selected and/or the total number of carriers selected being above/below a threshold.

Certain example embodiments may be based on carrier restriction. For example, the WTRU may be configured with a threshold priority of data. If the number of licensed carriers selected by the WTRU is above a threshold, the WTRU may restrict data transmissions above a threshold (higher priority) to be performed on a licensed carrier. For example, the WTRU may be configured with a threshold PBR. If the number of unlicensed carriers selected by the WTRU is above a threshold, the WTRU may restrict data from logical channels with PBR above a threshold to be performed on an unlicensed carrier. As another example, if the number of licensed carriers selected by the WTRU is above a threshold, the WTRU may restrict data transmissions for which HARQ feedback is enabled to be performed on a licensed carrier.

In one example embodiment, if the WTRU has selected at least one licensed carrier, the WTRU may restrict data for which a MCR is configured to be performed on a licensed carrier. In another example, if the WTRU has selected at least one licensed carrier, the WTRU may restrict broadcast data for which HARQ feedback is enabled, and where multiple HARQ feedback resources are configured for different WTRUs in the group, to be performed on a licensed carrier.

In certain embodiments, the WTRU may be configured with a threshold priority. For data above the threshold priority (higher priority), if at least one unlicensed carrier is selected, the WTRU may exclude transmission of such data on a carrier where, for example, LBT failure, consistent LBT failure, and/or the number of LBT failures exceeds a threshold, etc., has occurred in the last X seconds (where X may be configured by the network).

In another example, the WTRU may perform periodic transmissions on a licensed band only, and may be allowed to perform one-shot (i.e., single) transmissions on either licensed or unlicensed carriers.

According to some embodiments, a WTRU performs initial unicast transmission in DRX on an anchor carrier. In one solution, a TX WTRU may perform a first transmission, possibly when the RX WTRU is in DRX, to one specific carrier, and may then perform subsequent transmissions, possibly to the same RX WTRU, possibly within a maximum time after the first transmission, to multiple carriers.

The TX WTRU may limit the first transmission to a specific carrier (e.g., an anchor carrier). In certain examples, the anchor carrier may be predefined or (pre) configured. For example, each TX WTRU configured for transmissions to a L2 ID may have an anchor carrier, possibly associated to the L2 ID. For example, if the TX WTRU performs a first transmission to a L2 destination ID, the WTRU may perform the transmission on the anchor carrier associated with the L2 ID. In another example, the anchor carrier may be selected by the TX WTRU or the RX WTRU and configured between the two WTRUs (e.g., via PC5-RRC signaling). For example, the TX WTRU may perform selection of the anchor carrier based on one or a combination of the following factors:

- SL Measurements (e.g., CBR, CR, RSRP, RSSI, etc.). For example, the TX WTRU may be configured with a threshold CBR and/or threshold CR and/or threshold RSRP and may select an anchor carrier among the carriers whose corresponding measurement is above/below the threshold. The TX WTRU may select the anchor carrier as the carrier with the lowest CBR, the lowest CR, the largest SL RSRP, the lowest RSSI, etc.
- Licensed/unlicensed basis. For example, the TX WTRU may select the anchor carrier among the licensed carriers only.
- LBT failure status/statistics. For example, the TX WTRU may select as anchor carrier, the carrier with the fewest LBT failures, the carrier that does have a pending consistent LBT failure, possibly over a period of time, etc.
- Carrier configuration. For example, the TX WTRU may select the anchor carrier among the carriers that have some properties associated with its (resource pool) configuration, such as the carriers configured with PSFCH resources or the carriers configured with corresponding PUCCH resources.

In certain embodiments, a first transmission, possibly to an anchor carrier, may be limited in time. Specifically, a TX WTRU may limit the first transmission to the on-duration of the peer WTRU in DRX. Specifically, a TX WTRU may limit the first transmission to the active time of the RX WTRU.

In various embodiments, a first transmission, possibly to an anchor carrier, may be limited in physical layer characteristics such as MCS, HARQ feedback enabled/disable, number of resources, transmit power, etc. For example, a WTRU may be configured with a maximum/minimum value to use for such physical layer characteristics when performing a first transmission.

Alternatively, a first transmission, possibly to an anchor carrier, may have predefined or predetermined unlicensed transmission characteristics. For example, a first transmission may use the maximum/minimum channel access priority class (CAPC). For example, a first transmission may be performed with multi-slot resource in the unlicensed spectrum.

Whether the WTRU is performing a first transmission or not may be determined by the status of a timer. Such timer may be controlled by previous transmission and/or corresponding acknowledgements to previous transmissions. For example, a TX WTRU may restart an inactivity timer upon transmission to an RX WTRU. As long as the inactivity timer is running, the TX WTRU may perform transmissions corresponding to conditions associated with a subsequent transmission. If the inactivity timer has expired, the TX WTRU may perform transmissions corresponding to conditions of a first transmission.

Additionally, a first transmission, possibly performed on an anchor carrier, may provide information about subsequent transmissions, including: (i) the carrier(s) where subsequent transmissions may be performed; (ii) the inactivity time (i.e., the time associated with actions related to subsequent transmissions); (iii) whether the initial transmission will be followed by subsequent transmissions or not; and/or (iv) information about subsequent transmissions.

Information whether the initial transmission will be followed by subsequent transmissions or not may specify, for example, if the initial transmission is not followed by subsequent transmissions, the next transmission by the TX WTRU is considered a first transmission, and is made with properties herein associated with a first transmission. Alternatively, for example, if the initial transmission is followed by subsequent transmissions, the next transmission (as long as it occurs within the inactivity time) is performed with properties associated with subsequent transmissions. Information about subsequent transmissions may be included in a MAC CE, MAC header, SCI, or RRC message included in an initial transmission.

Examples where a WTRU performs subsequent transmissions based on information included in the first transmission follow. In one example, following an initial transmission, a WTRU may perform subsequent transmissions using the properties associated with subsequent transmissions. Such properties may have been provided to the peer WTRU. For example, a WTRU may perform subsequent transmissions on any of the carriers indicated to the peer WTRU in the initial transmission.

A TX WTRU may change the properties of the subsequent transmission during the transmission of a subsequent transmission. For example, the TX WTRU may change carriers for additional subsequent transmissions by including the carriers in a message to the TX WTRU during a subsequent transmission.

A TX WTRU may initiate subsequent transmissions, or change the properties of subsequent transmissions following a response from the RX WTRU to the message containing such properties (or to the initial transmission). For example, the TX WTRU may start transmissions on carriers other than the anchor carrier only following reception of an acknowledgement to the initial transmission.

In some embodiments, a WTRU restricts certain transmissions to the anchor carrier and/or to be used as a first transmission. A WTRU may limit certain transmission to the anchor carrier, regardless of the DRX configuration. For example, a WTRU may: (i) perform PC5-S transmissions on the anchor carrier only; (ii) perform PC5-RRC transmissions on the anchor carrier only; (iii) perform discovery transmissions on the anchor carrier only; (iv) perform initial DCR transmissions on the anchor carrier only; and/or (v) use conditions associated with data (described herein) to decide whether to limit such data transmission to the anchor carrier.

Embodiments for resource selection for multicarrier with licensed and unlicensed carriers will now be described. In one example embodiment, a WTRU jointly selects an initial and backup resource on an unlicensed and licensed carrier respectively when performing some transmissions for certain QoS.

Figure 4:
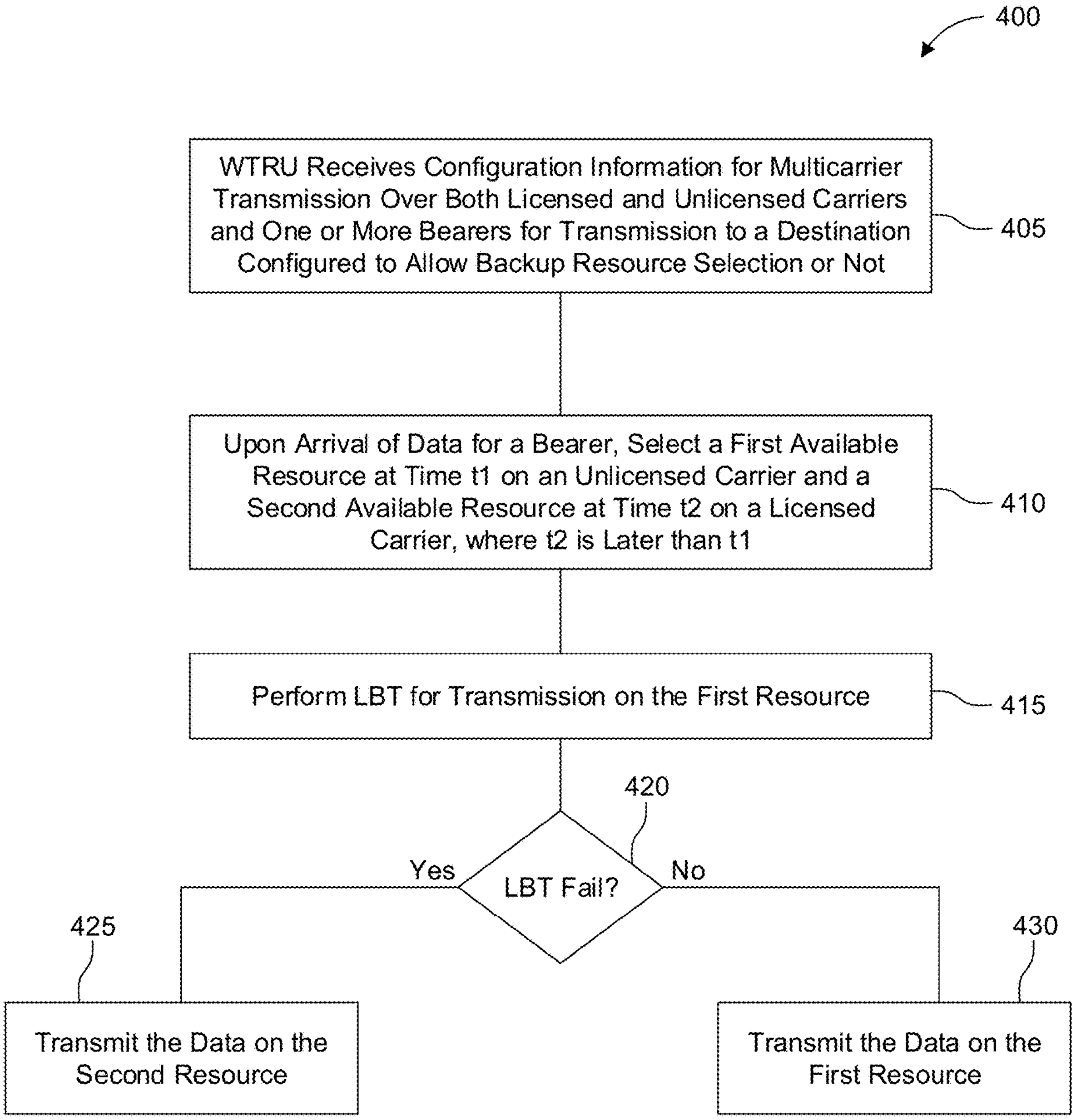
FIG. 4 is a flow diagram illustrating a method of resource selection for multicarrier with licensed and unlicensed carriers according to an embodiment.

Referring to FIG. 4, an example method 400 for multicarrier resource selection with licensed and unlicensed carriers is shown. A SL TX WTRU may be configured 405 with multicarrier over both licensed and unlicensed carriers with one or more bearers for transmission to a destination, which are configured to allow backup resource selection or not.

Upon arrival of data for a bearer that allows backup resource selection, the WTRU performs 410 a joint resource (re) selection procedure on a licensed and unlicensed carrier such that a first available resource is selected at time t1 on the unlicensed carrier, and a second available resource is selected at time t2, later than t1 (by an amount up to the WTRU) on the licensed carrier, and t1 and t2 are within the resource selection window. The WTRU may perform 415 LBT for transmission on the first resource and if 420 LBT fails, transmits 425 the data on the second resource. Otherwise, the WTRU transmits 430 the data on the first resource and includes information about the second resource in the transmission.

According to some embodiments, resource selection may be performed jointly in multiple carriers. In one solution, a WTRU may perform a joint resource selection procedure on multiple carriers in that, a WTRU may select two or more resources across two or more carriers. For example, a WTRU may select a first resource on a first carrier and a second resource on a second carrier. The second resource may be used in case transmission on the first resource cannot be performed (e.g., due to LBT failure).

In various embodiments, conditions for joint resource selection in multiple carriers may be applied. For example, a WTRU may perform the joint resource selection based one or more of the conditions relating to: (i) QoS or carrier configuration; (ii) type/availability of a carrier; (iii) measurements on the carriers; and/or (iv) capabilities of the RX WTRU.

In applying conditions for QoS or carrier configuration, a WTRU may perform joint resource selection when the QoS of the data available for transmission allows it, for example, the priority of data available for transmission is above a threshold or the data available for transmission is on a LCH configured with joint resource selection enabled.

The conditions for joint resource selection may depend on the carrier type of the available or selected carriers. For example, a WTRU may perform joint resource selection when the selected carrier for (the first) transmission of a transport block (TB) is an unlicensed carrier. In an example, a WTRU may perform joint resource selection when the second transmission is performed on a licensed carrier.

The conditions for joint resource selection may depend on measurements on the carriers themselves (CBR, CR, RSRP, RSSI, LBT failure statistics, etc.), or on all the carriers available, or on the selected carriers. For example, a WTRU may perform joint resource selection when the RSSI of all/selected/specific carrier(s), potentially unlicensed, is above a threshold. In another example, a WTRU may perform joint resource selection when the CBR of all/select/specific carrier(s), potentially licensed, is below a threshold. In another example, a WTRU may perform joint resource selection when the (consistent) LBT failure(s) on all/selected/specific unlicensed carrier(s), over a period of time, exceeds a threshold. Lastly, the capability of a peer WTRU to support the joint resource selection by the TX WTRU may also be a condition for joint resource selection.

Considerations for selection of the resources are disclosed. In various embodiments, a WTRU may be configured with conditions on the resources selected in each of the carriers. Specifically, the WTRU may be configured with conditions on the resource size. In an example, the WTRU may select two resources of the same size. In an example, the difference in resource size should be less than/greater than a configured threshold. The size of the second resource (or the size difference between the first and second resource) may further depend on conditions associated with the carrier used or the data QoS.

Conditions associated with the carrier used for selecting the first resource may include, for example, the (maximum) size of the second resource being configured based on measurements of the first resource (e.g., RSSI, CBR, CR, etc.), or based on a measure of the occupancy (e.g., number of LBT failures, etc.) of the unlicensed channel used when selecting the first resource. In one example, the (maximum) size of the second resource may depend on the frequency difference in the carriers between the first and second carriers.

Conditions associated with the data QoS may include, for example, the size difference between the first and the second resource may be configured based on the priority of the highest priority LCH with data available for transmission that triggered the resource selection A WTRU may further be configured with conditions on the timing of the first resource and the second resource. Such conditions may dictate the minimum/maximum time difference between the first resource and the second resource and may dictate the allowable time window of both the first resource and the second resource. Specifically, when using sensing results for selecting the two resources, the WTRU should select available resources which meet the conditions of the first resource. For example, the PHY layer may provide all available resources to the MAC layer and the MAC layer may select resources that meet certain time conditions disclosed herein. For example, the WTRU may determine the timing of the resources based on WTRU capabilities, QoS/priority/packet delay budget (PDB) of the data, channel access priority class (CAPC) (or other similar LBT requirements), HARQ round trip time (RTT) and/or whether HARQ feedback is enabled/disabled, type of carrier (e.g., licensed or unlicensed) associated with the first/second resource and/or measurements of the first and/or second carriers. Examples are as follows:

- WTRU capabilities may be used to determine the minimum time difference between the first and second resource;
- QoS/priority/PDB of the data. For example, the first and second resource should both be within a time window defined by T2 (i.e., the PDB associated with the data that triggered resource selection);
- CAPC of the data (or other similar LBT requirements), For example, the minimum time difference between the first and second resource may be determined by the CAPC of the data. Specifically, the second resource should allow the WTRU to perform LBT on the first carrier, and only when LBT fails, the WTRU can perform transmission on the second resource associated with the second carrier. The time required to determine LBT failure may depend on CAPC of the data, LBT requirements, etc.;
- HARQ RTT and/or whether HARQ feedback is enabled/disabled. For example, the minimum time difference between the first resource and the second resource may depend on factors that determine the HARQ RTT, such as the PSFCH configuration, whether HARQ feedback is enabled/disabled, etc.;
- The type of carrier (e.g., licensed or unlicensed) associated with the first/second resource. For example, the WTRU may use a different value of T2 (derived from the PDB) depending on whether the second carrier is licensed or unlicensed; and/or
- The measurements of the first and/or second carriers. For example, the WTRU may use a different value of T2 (derived from the PDB) depending on the CBR of the second carrier. For example, the RSSI of the first carrier may be used to determine the minimum/maximum time difference between the resources in the first carrier and the second carrier;

The transmission behavior associated with the two carriers according to various embodiments will now be described. In an example, the first resource may be selected on an unlicensed carrier and the second resource may be selected on a licensed carrier or an unlicensed carrier. Use of the first and/or second resource, and the contents of the transmission on the first and/or second resource may depend on the LBT status during transmission on the first resource.

In an example of LBT failure on the first resource, the WTRU may perform LBT on the first resource associated with the first carrier. If LBT fails, the WTRU may transmit the same transport block (TB) on the second resource. Alternatively, the WTRU may create a new TB for transmission on the second resource. Whether the same/different TB is transmitted on the second resource may depend on the timing of the resources and/or the size of the resources. Specifically, if the WTRU selects a second resource which occurs at least "X" number of slots after the first resource, the WTRU may perform transmission of a new TB on the second resource. The WTRU may transmit a legacy SCI on the second resource. Alternatively, the WTRU may indicate (e.g., in SCI) that LBT failed on the first resource. Alternatively, the WTRU may include, in the second transmission, a message containing information about the LBT failure associated with the first resource (e.g., in a MAC CE). For example, the WTRU may indicate the LBT sensing time, the RSSI, etc., in such a message.

In the event LBT is successful on the first resource, in one solution, if LBT succeeds on the first resource, the WTRU may not perform transmission on the second resource. A WTRU may send an indication in the transmission on the first resource (e.g., in SCI) with an indication of the time/frequency location of the second resource. Specifically, the WTRU may indicate the availability of the second resource in SCI. Alternatively, or in addition, the WTRU may decide to use the second resource for transmission of a second TB. The WTRU may indicate the occupancy of the second resource in the transmission on the first resource (e.g., in SCI). The WTRU may be configured with conditions on whether or not to utilize the second resource in the event that LBT/transmission succeeded on the first resource. For example, such conditions may be based on one, or a combination, of the following:

(1) QoS of the data available for transmission. For example, if the WTRU has data available for transmission (after performing transmission on the first resource) with priority above a threshold, the WTRU may use the second resource for transmission of a new TB.

(2) Availability of control information or inter-WTRU coordination information. In an example, if the WTRU has inter-UE coordination (IUC) information, the WTRU may use the second resource to transmit IUC information. In one example, if the WTRU has CQI information pending for transmission, the WTRU may use the second resource for transmission of IUC information. In another example, the WTRU may use the second resource to opportunistically transmit any pending control information intended for a peer WTRU.

(3) Buffer status. In one example, if the buffer occupancy of the WTRU is above a threshold, possibly for a specific logical channel, the WTRU may use the second resource.

(4) Prioritized bit rate (PBR). In an example, if the WTRU has at least one LCH with $Bj>0$, the WTRU may use the second resource for transmission of a new TB.

(5) Availability of grants. As an example, the WTRU may use the second resource for transmission of a new TB, if it does not have other grants, possibly within a specific time window.

Embodiments for Carrier-Specific SL radio link failure (RLF) based on HARQ counting will now be described.

Legacy SL radio link failure (RLF) is designed for a single carrier. One issue with HARQ-based counting in unlicensed, is that existing mechanisms are unable to distinguish whether an HARQ DTX is due to decoding failure or a LBT failure at the RX WTRU. Use of a licensed carrier for information regarding HARQ DTX counting of unlicensed carrier(s) may help resolve this issue. According to one example embodiment, a WTRU resets/updates carrier-specific SL-RLF HARQ DRX counters upon reception of a message (e.g., reset MAC CE) received from the RX WTRU.

Figure 5:
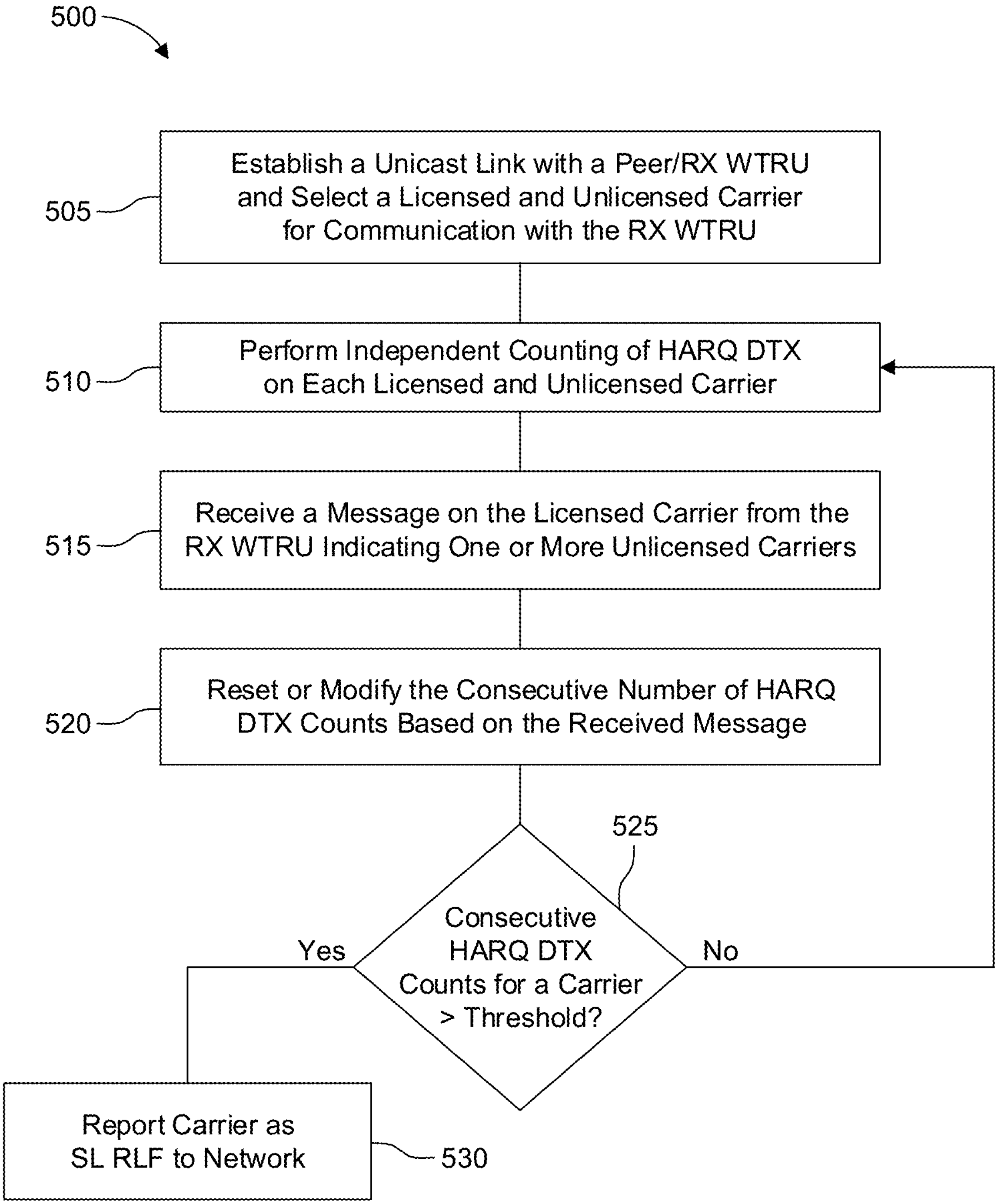
FIG. 5 is a flow diagram illustrating a method of carrier-specific sidelink radio link failure (RLF) based on HARQ counting for multicarrier with licensed and unlicensed carriers according to an embodiment.

Referring to FIG. 5, an example method 500 is shown for determining carrier-specific SL RLF of unlicensed carrier(s) based on feedback information in a licensed carrier is shown. A SL TX WTRU may establish 505 a unicast link with a peer WTRU and select multiple licensed and/or unlicensed carriers for communication. Independent (i.e., separate counters per carrier) counting of HARQ DTX is performed 510 on each carrier (licensed and unlicensed). A message (e.g., a MAC CE) is received 515 on a licensed carrier from the RX WTRU that indicates reception information on one or more unlicensed carrier(s), e.g., whether a TB was received or not for an unlicensed carrier. Upon reception of the message, the WTRU may modify 520 the consecutive number of HARQ DTX on the indicated carrier (s). For example, the TX WTRU may reset the consecutive number of HARQ DTX or subtract a value (e.g., indicated in the MAC CE) from the current count of consecutive HARQ DTX, based on information in the received message. If 525 the number of consecutive HARQ DTX on a carrier reaches a threshold, the WTRU may indicate 530 carrier-specific SL RLF to the network for that carrier.

In various embodiments, a WTRU transmits/receives unlicensed carrier information on a licensed carrier. In one family of solutions, a WTRU may receive/transmit LBT-related or channel access-related information about a SL unlicensed carrier on a SL licensed carrier. Specifically, a WTRU may receive information about LBT failure, buffer status, channel occupancy time (COT) information, etc. on a licensed carrier, which represents information about access or transmission related to an unlicensed carrier. Similarly, based on certain triggers related to channel access on the unlicensed carrier, a WTRU may transmit information about the access on the unlicensed carrier in a SL message on the licensed carrier. A WTRU receiving such information may use the information to update counters, timers, resource allocation, and/or modify channel access on the unlicensed or licensed spectrum.

Information related to the unlicensed spectrum mentioned above may include one, or a combination, of any of the following:

(1) LBT status. As an example, a WTRU may transmit a message on the licensed carrier indicating LBT failure, consistent LBT failure, or similar information related to one or more unlicensed carriers.

(2) HARQ feedback failure status. In various examples, a WTRU may transmit a message on the licensed carrier indicating the failure to transmit HARQ ACK/NACK on the unlicensed spectrum due to LBT failure. By way of example, a WTRU may transmit a message on the licensed carrier upon failure to access the channel to send HARQ feedback on the unlicensed spectrum. In another example, a WTRU may transmit a message on the licensed carrier following "X" number (a configured value) of consecutive LBT failures associated with transmission of HARQ feedback. In an example, a WTRU may indicate in the message the number of consecutive LBT failures associated with HARQ feedback.

(3) Buffer status information. According to one example, a WTRU may transmit a message on the licensed carrier indicating the priority/CAPC/amount/L2 destination IDs of data available for transmission that can be sent (and is yet to be transmitted) on the unlicensed carrier.

(4) Channel occupancy measurements. In some examples, a WTRU may transmit a message containing measurements of the channel occupancy of the unlicensed spectrum such as RSSI (possibly per RB set), CR, CBR, ratio of time period where SCI from other WTRUs can be detected, etc. In one example, a WTRU may perform a measurement of the channel indicating the ratio of time in which the RSSI is above a threshold without detection of SCI (i.e., an indication that the channel is occupied by WiFi transmissions).

(5) Channel occupancy time (COT) information. In an example, a WTRU may transmit a message upon reception/detection of COT information received on an unlicensed carrier, and the contents of the COT information (e.g., the length of the COT, the CAPC, the L2 destination IDs, etc.).

According to various embodiments, a WTRU may use received LBT failure information to manage SL RLF detection. In one solution, a WTRU may use a message from a peer WTRU on the licensed spectrum to update the counting of HARQ DTX for SL RLF on the unlicensed spectrum. For example, upon reception of a message on the licensed carrier indicating an unlicensed carrier, the TX WTRU may reset the number of consecutive HARQ DTX counter for SL RLF for that carrier. In an example, upon reception of a message on the licensed carrier indicating an unlicensed carrier, the WTRU may subtract, at most, a (pre) configured amount from the number of consecutive HARQ DTX counter for SL RLF for that carrier. In one example, upon reception of a message on the licensed carrier indicating an unlicensed carrier and a value, the WTRU may subtract, at most, the received value from the number of consecutive HARQ DTX counter for SL RLF for that carrier. In an example, upon reception of a message on the licensed carrier indicating to enable/disable/suspend/resume HARQ DTX counting for SL RLF, a WTRU may enable/disable/suspend/resume HARQ DTX counting for SL RLF on the indicated unlicensed carrier.

In certain embodiments, a WTRU uses received COT/BSR information for scheduling. In one family of solutions, a WTRU may use received COT/BSR information for scheduling transmission on the unlicensed spectrum. In one solution, a WTRU may use COT information received on the licensed carrier from the peer WTRU to perform resource selection. Specifically, the WTRU may use information about the COT duration to select a resource which falls within the COT.

In another solution, a WTRU may use buffer status information received on the licensed carrier from the peer WTRU to determine COT information. Specifically, the WTRU may determine a COT duration based on the amount of data indicated in buffer status from the peer WTRU. Specifically, if the buffer status is above a threshold, the WTRU may use a corresponding maximum COT duration. In another example, the WTRU may determine a set of L2 destination IDs (e.g., allowable COT sharing destinations) based on the L2 IDs associated with pending data in the buffer status information received from the peer WTRU on the licensed spectrum. Specifically, if the received message has SL RSRP above a threshold, the WTRU can include the L2 IDs associated with buffer status provided by the peer WTRU in the message.

In another solution, a WTRU may use buffer status information received on the licensed carrier to determine the logical channel prioritization (LCP) behavior during transmission on the unlicensed spectrum. For example, if the BSR information indicates data associated with a specific priority, the WTRU receiving the BSR may include data in logical channels associated with the same/higher/lower priority than the specific priority.

In yet another solution, a WTRU may use buffer status information received on the licensed carrier to determine the CAPC used to access the channel for creating a shared COT. Specifically, the WTRU may use either the priority of the data in its own buffers, or the priority of the data in the peer WTRU's BSR (i.e., received in a message on the licensed spectrum) to determine the CAPC for channel access. For example, if the BSR information indicates data associated with a specific priority (potentially larger than the priority associated with any data in the transmitting WTRU's buffers), the WTRU may use a CAPC associated with the peer WTRU's BSR information rather than the WTRU's own information.

Embodiments for SL RLF in multicarrier with licensed and/or unlicensed carriers will now be described. Legacy SL RLF based on HARQ feedback is designed for a single carrier. For multicarrier, SL RLF may be per carrier and/or per link, and this may depend on the correlation between the carriers. According to one example embodiment, a WTRU triggers SL-RLF, releases a unicast link, and informs the network when resource selection is unable to find at least one licensed/unlicensed carrier that meets a CBR threshold. In another example embodiment, a WTRU determines carrier-specific RLF for a licensed or unlicensed carrier in multi-carrier SL with a peer WTRU based on a number of consecutive DTX counts for a specific carrier exceeding a threshold DTX count and reselects a new carrier, excluding carriers previously determined with carrier-specific RLF and the TX WTRU may release the multicarrier link with the RX WTRU only when no carriers remain which have not been determined with carrier-specific RLF.

Figure 6:
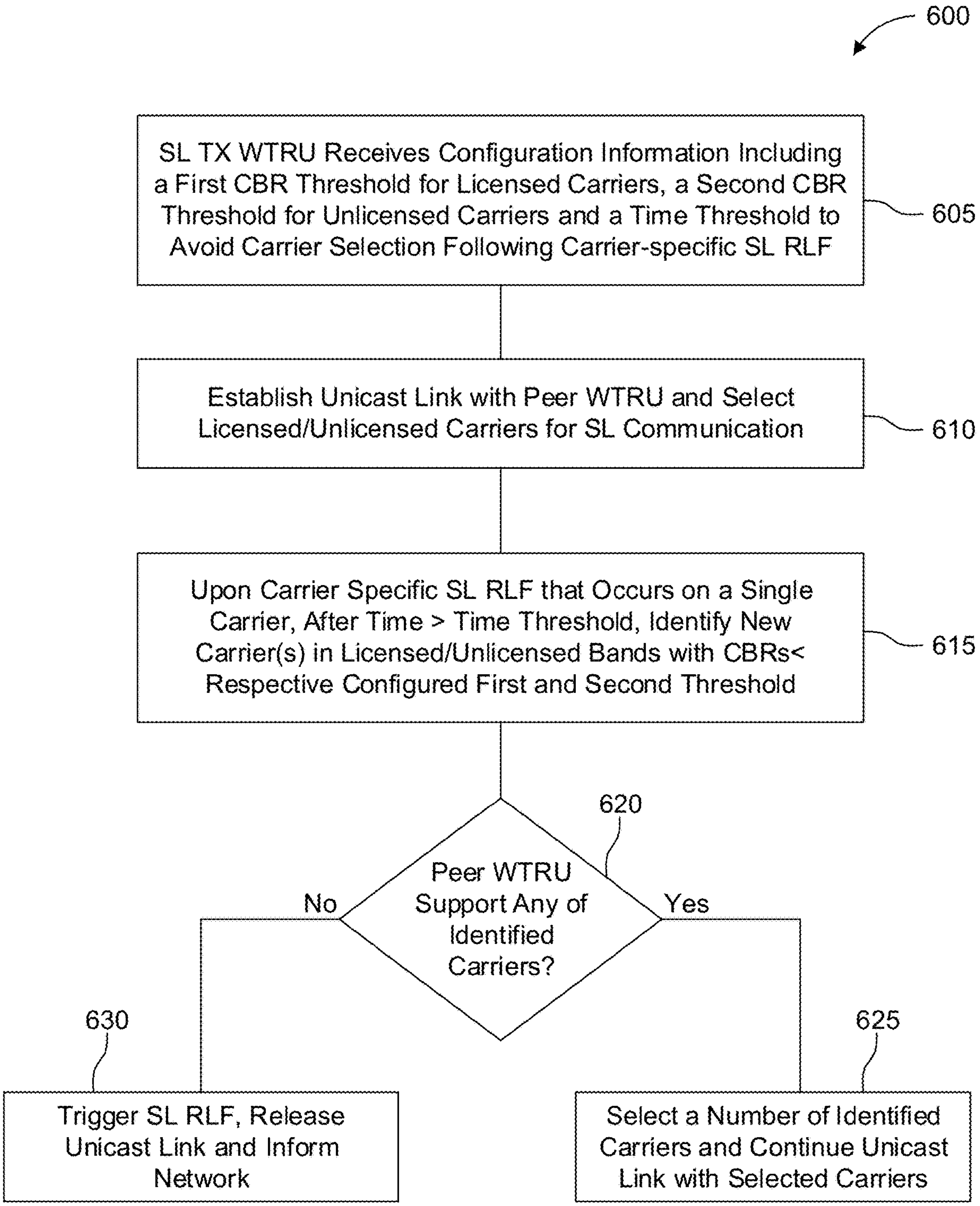
FIG. 6 is a flow diagram illustrating a method of handling sidelink RLF in multicarrier with licensed and unlicensed carriers according to an embodiment.

Referring to FIG. 6, an example method 600 for determining carrier-specific SL RLF and/or link failure based on configured CBR thresholds is shown. A SL TX WTRU may be configured 605 with a first CBR threshold for licensed carriers and a second CBR threshold for unlicensed carriers as well as configured with a time period to avoid carrier selection following carrier-specific SL RLF. The TX WTRU establishes 610 a unicast link with a peer WTRU and selects multiple licensed and/or unlicensed carriers for communication.

Upon carrier-specific SL RLF that occurs on a single carrier, carrier (re) selection 615 may be triggered and a number of SL carriers are selected on the licensed band whose CBR is below a first threshold, and a number of carriers selected on the unlicensed band that is below a second threshold, where the time period between the triggering of carrier (re) selection and the last carrier-specific SL RLF for this unicast link exceeds the (pre) configured time period threshold. If 620, the SL TX WTRU is unable to select at least one carrier supported by the RX WTRU, SL-RLF is triggered 630, the unicast link is released, and the network informed. Otherwise, the SL TX WTRU selects 625 a number of carriers and continues operation of the unicast link with the selected carriers.

In various solutions, SL RLF may be triggered per carrier, referred to herein as carrier-specific SL RLF. In one solution, a WTRU operating in multicarrier can monitor/detect/trigger carrier-specific SL RLF. Specifically, SL RLF can be triggered per carrier where the WTRU maintains a counter per carrier counting the number of consecutive HARQ DTXs received on a given carrier, where the counters are incremented/reset independently based on reception of HARQ feedback from the RX WTRU. When the number of consecutive HARQ DTX on a carrier reaches a maximum threshold, the WTRU triggers SL-RLF for that carrier (but not other carriers). In various embodiments, carrier-specific SL RLF does not immediately result in releasing a unicast link, as the WTRU may continue to operate the unicast link on another carrier.

Figure 7:
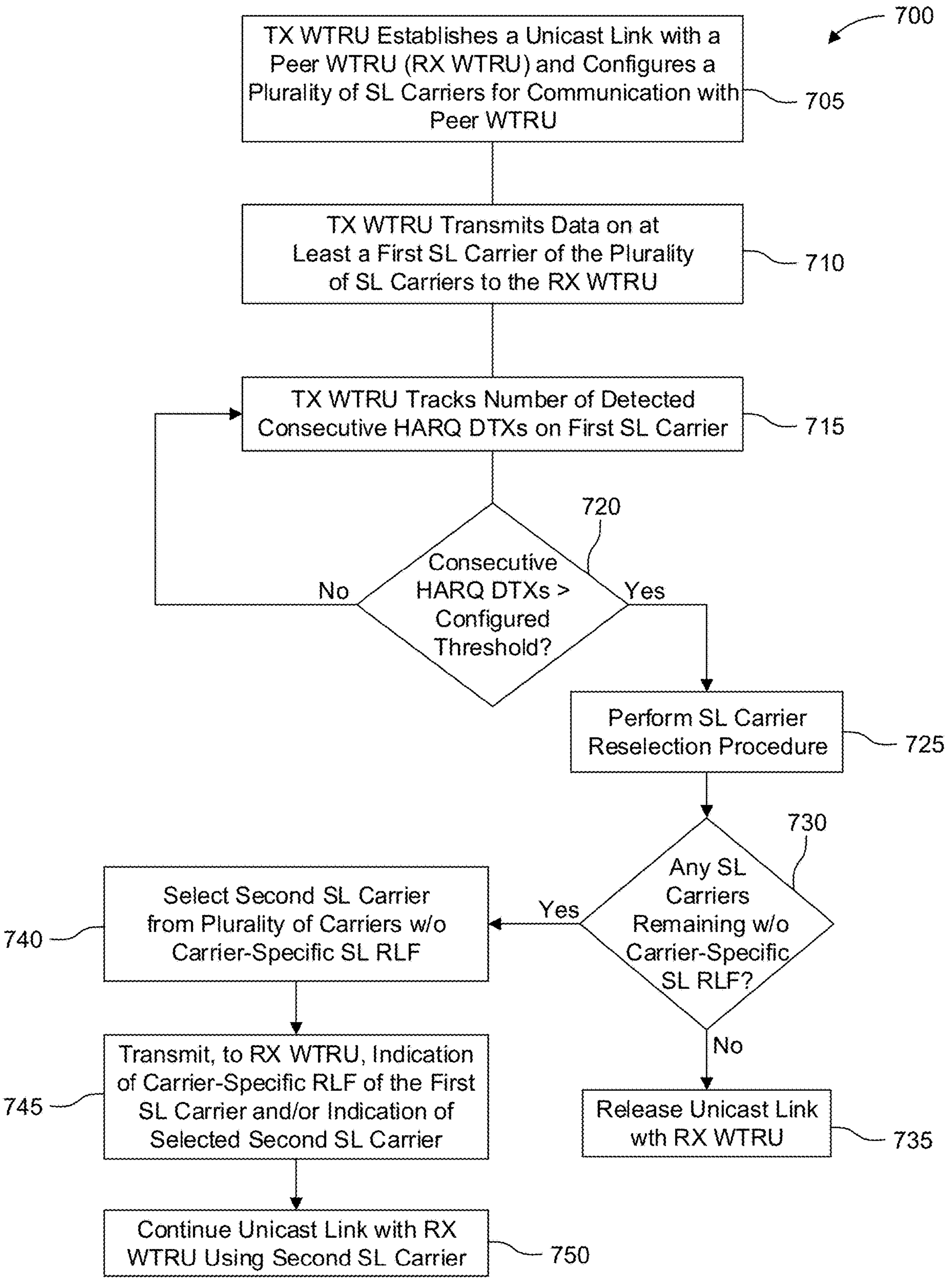
FIG. 7 is a flow diagram illustrating a method of determining carrier-specific sidelink RLF based on HARQ counting for multicarrier according to an embodiment.

Referring to FIG. 7, a method 700 for determining carrier-specific SL RLF based on HARQ DTX is shown. The TX WTRU may establish 705 a unicast link with a RX WTRU and configure the RX WTRU to allow use a plurality of SL carriers, e.g., using licensed and/or unlicensed carriers. The TX WTRU transmits 710 data to the RX WTRU using at least a first SL carrier of the plurality of SL carriers. The TX WTRU tracks 715 the number of detected consecutive HARQ DTXs on the first SL carrier until the number exceeds 720 a configured DTX count threshold. At this point, carrier-specific SL RLF is determined for the first SL carrier and a SL carrier reselection procedure is initiated 725 by the TX WTRU. If 730, no SL carriers remain of the plurality of carriers which have not been determined with carrier-specific RLF, the unicast link with the RX WTRU is released 735 by the TX WTRU. Otherwise 730, a second SL carrier is selected 740 from the plurality of carriers and the TX WTRU indicates 745 carrier-specific RLF of the first carrier to the RX WTRU and the unicast link with the RX WTRU is maintained 750. In certain configurations, at step 745 the TX WTRU may additionally indicate the selected second SL carrier to the RX WTRU.

In some embodiments, a WTRU configured to perform carrier-specific SL RLF monitoring may be configured with a different value of the maximum number of consecutive HARQ DTX. For example, the WTRU may apply a first value for licensed carriers and a second value for unlicensed carriers.

In some embodiments, a WTRU may trigger carrier-specific SL RLF following reception of an indication of DTX or carrier-specific SL RLF from a peer WTRU, e.g., received in another carrier.

Actions upon triggering carrier-specific SL RLF. A WTRU, upon triggering carrier-specific SL RLF, may perform any one, or a combination, of the following actions:

(1) Suspend the carrier from being used. In an example, the RLF determined carrier is considered to no longer be available as being a selected carrier. Alternatively, the carrier can be still considered as a selected carrier, but the WTRU cannot select/receive any grants on the carrier.

(2) Start a carrier prohibit timer associated with (re) selecting the carrier, or transmitting on the carrier. In an example, the WTRU may start a timer associated with the failed carrier. While the timer is running and not expired, the WTRU is unable to select the carrier during a carrier selection procedure. A WTRU may start a carrier prohibit timer following reception of an indication from a peer WTRU (received in another carrier) or as a result of carrier-specific SL RLF on a carrier. In various embodiments, the WTRU may be configured with different carrier prohibit timers for licensed and unlicensed spectrum.

(3) Trigger carrier reselection. As discussed at step 725 of FIG. 7, the WTRU may initiate a carrier reselection procedure. The WTRU may be configured with conditions related to when carrier-specific SL RLF triggers carrier reselection. For example, if the carrier that triggered SL-RLF had CBR below a threshold, if the number of remaining (selected) carriers, possibly having CBR below a threshold, falls below a threshold number of carriers, if conditions related to the number of selected licensed/unlicensed carriers discussed herein are not met and/or if the carrier that triggered SL-RLF had the lowest CBR of all selected carriers, carrier reselection may be performed.

(4) Inform the peer WTRU of SL-RLF on a carrier by transmitting a message on another carrier.

In one solution, a WTRU may trigger SL-RLF of the link itself following a failure of carrier (re) selection. Specifically, carrier-specific SL RLF may trigger carrier (re) selection. Other events (e.g., changes in CBR) may also trigger carrier (re) selection. During carrier reselection, a WTRU may not select any carriers that recently (i.e., based on the value of a prohibit timer) triggered carrier-specific SL RLF. A WTRU may further determine whether it can use a carrier based on a CBR threshold, where: (i) the CBR threshold used for carrier (re) selection following carrier-specific SL RLF may be different than the CBR threshold following carrier (re) selection for other reasons; (ii) the CBR threshold for licensed and unlicensed carriers during carrier (re) selection may be different; (iii) the number of carriers to select following carrier-specific SL RLF may be different compared to the number of carriers to select for normal carrier (re) selection; and/or (iv) following carrier-specific SL RLF, the WTRU may reselect only the failed carrier, while the other carriers are maintained. During carrier (re) selection for other reasons the WTRU may perform a full carrier reselection procedure.

SL RLF triggered based on counting across multiple carriers. In one solution, a WTRU may be configured to perform HARQ DTX counting commonly across some/all carriers. For example, a subset of carriers may be configured as related carriers at the SL WTRU. In such case, the SL WTRU may count HARQ DTX commonly across those related carriers. For example, related carriers may be configured explicitly (e.g., in RRC signaling), or may be determined implicitly (e.g., based on pool configuration or PSFCH configuration). For example, carriers which allow cross carrier PSFCH transmission may be considered as related carriers from HARQ DTX counting for SL RLF determination.

In another solution, a WTRU may count HARQ DTX across multiple carriers differently. Specifically, a WTRU may perform any of the following when counting HARQ DTX across multiple carriers:

(1) A WTRU may consider multiple HARQ DTX as a single instance (or increment the counter by one only). The WTRU may perform such behavior based on conditions associated with the relative timing of the PSFCH resources, the relative frequency between the carriers, whether the PSFCH resources are configured for cross carrier HARQ feedback, or whether the PSFCH resources can both be used to report HARQ feedback for a single transmission. Specifically, if two PSFCH resources on different carriers are within x slots of each other, HARQ DTX associated with both resources are counted only once.

(2) A WTRU may be configured with a different value of maximum number of HARQ DTXs to trigger SL RLF based on the number of carriers which have common counting across them and/or whether cross-carrier HARQ feedback is configured or not, and the specific configuration.

(3) A WTRU may reset the counter for the number of consecutive HARQ DTXs only when the PSFCH is received in multiple (or a subset) or the related carriers. For example, the counter is only reset if the WTRU decodes a PSFCH successfully on two of the N carriers for which common counting is being performed.

Upon SL RLF triggered for a set of carriers where counting is being performed jointly, the WTRU may stop: (i) using all carriers for a period of time; (ii) using only the carriers where the majority of HARQ DTXs were counted and/or (iii) using different carriers in the set for a different amount of time based on the number of the consecutive HARQ DTXs which were counted specifically on that carrier.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for a wireless transmit and receive unit (WTRU), the method comprising:

establishing a unicast link with a peer WTRU, wherein the unicast link is configured with a plurality of sidelink (SL) carriers;

transmitting data, on at least a first SL carrier of the plurality of SL carriers, to the peer WTRU;

determining a carrier-specific SL radio link failure (RLF) of the first SL carrier based on a number of detected consecutive hybrid automatic repeat request (HARQ) discontinuous transmissions (DTXs) on the first SL carrier and a threshold HARQ DTX count;

based on the determined carrier-specific SL RLF of the first SL carrier, performing a SL carrier reselection procedure to select a second SL carrier from the plurality of SL carriers, excluding the first SL carrier determined with the carrier-specific SL RLF; and transmitting, to the peer WTRU, an indication of the carrier-specific RLF of the first SL carrier.

2. The method of claim 1, further comprising:

determining a carrier-specific SL RLF of the second SL carrier based on a number of detected consecutive HARQ discontinuous transmissions (DTXs) on the second SL carrier and the threshold HARQ DTX count;

based on the determined carrier-specific SL RLF of the second SL carrier, performing the SL carrier reselection procedure to select a further SL carrier from the plurality of SL carriers, excluding the first SL carrier and the second SL carrier determined with the carrier-specific SL RLF;

determining the SL carrier reselection procedure to select the further SL carrier fails due to all carriers of the plurality of SL carriers having the carrier-specific SL RLF; and releasing the unicast link with the peer WTRU.

3. The method of claim 1, wherein the unicast link comprises a vehicle-to-everything (V2X) carrier aggregation (CA) sidelink.

4. The method of claim 1, wherein the indication of the carrier-specific RLF of the first SL carrier is sent using a PC5-radio resource control (RRC) message.

5. The method of claim 1, wherein the plurality of SL carriers comprises carriers in a licensed spectrum.

6. The method of claim 1, wherein the plurality of SL carriers comprises at least one licensed carrier and at least one unlicensed carrier.

7. A wireless transmit and receive unit (WTRU) comprising: a transceiver and a processor in communication with the transceiver, the transceiver and processor configured to:

establish a unicast link with a peer WTRU, wherein the unicast link is configured with a plurality of sidelink (SL) carriers;

transmit data, on at least a first SL carrier of the plurality of SL carriers, to the peer WTRU;

determine a carrier-specific SL radio link failure (RLF) of the first SL carrier based on a number of detected consecutive hybrid automatic repeat request (HARQ) discontinuous transmissions (DTXs) on the first SL carrier and a threshold HARQ DTX count;

based on the determined carrier-specific SL RLF of the first SL carrier, perform a SL carrier reselection procedure to select a second SL carrier from the plurality of SL carriers, excluding the first SL carrier determined with the carrier-specific SL RLF; and transmit, to the peer WTRU, an indication of the carrier-specific RLF of the first SL carrier.

8. The WTRU of claim 7, wherein the transceiver and processor are further configured to:

determine a carrier-specific SL RLF of the second SL carrier based on a number of detected consecutive HARQ discontinuous transmissions (DTXs) on the second SL carrier and the threshold HARQ DTX count;

based on the determined carrier-specific SL RLF of the second SL carrier, perform the SL carrier reselection procedure to select a further SL carrier from the plurality of SL carriers, excluding the first SL carrier and the second SL carrier determined with the carrier-specific SL RLF;

determine the SL carrier reselection procedure to select the further carrier fails due to all carriers of the plurality of SL carriers having the carrier-specific SL RLF; and release the unicast link with the peer WTRU.

9. The WTRU of claim 7, wherein the unicast link comprises a vehicle-to-everything (V2X) carrier aggregation (CA) sidelink.

10. The WTRU of claim 7, wherein the indication of the carrier-specific RLF of the first SL carrier is sent using a PC5-radio resource control (RRC) message.

11. The WTRU of claim 7, wherein the plurality of SL carriers comprises carriers in a licensed spectrum.

12. The WTRU of claim 7, wherein the plurality of SL carriers comprises at least one licensed carrier and at least one unlicensed carrier.

13. A method for a wireless transmit and receive unit (WTRU), the method comprising:

sending, to a peer WTRU on a PC5 link, radio resource control (RRC) signaling to configure multicarrier vehicle-to-everything (V2X) sidelink (SL) communication with the peer WTRU using a plurality of SL carriers;

monitoring, hybrid automatic repeat request (HARQ) feedback from the peer WTRU, to detect a number of consecutive discontinuous transmissions (DTXs) on a first SL carrier used to transmit data to the peer WTRU;

determining a carrier-specific SL radio link failure (RLF) of the first SL carrier based on the detected number of consecutive HARQ DTXs on the first SL carrier and a configured HARQ DTX count threshold;

based on the determined carrier-specific SL RLF of the first SL carrier, performing carrier reselection from the plurality of SL carriers, excluding the first SL carrier determined with the carrier-specific SL RLF; and on a condition one or more SL carriers of the plurality of SL carriers without the carrier-specific SL RLF are available, selecting a second SL carrier from the one or more SL carriers to maintain the PC5 link and indicating the carrier-specific SL RLF of the first SL carrier to the peer WTRU, otherwise, releasing the PC5 link with the peer WTRU.

14. The method of claim 13, wherein the HARQ feedback is monitored on a physical sidelink feedback channel (PSFCH) with the peer WTRU.

15. The method of claim 14, wherein the indication of the carrier-specific SL RLF of the first SL carrier to the peer WTRU is sent using a PC5-radio resource control (RRC) message.

* * * * *